US011059967B2

(12) United States Patent
Lin et al.

(10) Patent No.: US 11,059,967 B2
(45) Date of Patent: Jul. 13, 2021

(54) EPOXY STABILIZATION USING ACID-COATED NITROGEN CONTAINING CATALYSTS, PARTICLES, AND METHODS

(71) Applicant: 3M INNOVATIVE PROPERTIES COMPANY, St. Paul, MN (US)

(72) Inventors: Ying Lin, Woodbury, MN (US); Hassan Sahouani, Hastings, MN (US); Michael A. Kropp, Cottage Grove, MN (US); Matthew J. Kryger, Hudson, WI (US); Luke E. Heinzen, Shoreview, MN (US); Jonathan W. Kemling, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 165 days.

(21) Appl. No.: 16/468,062

(22) PCT Filed: Dec. 6, 2017

(86) PCT No.: PCT/US2017/064825
§ 371 (c)(1),
(2) Date: Jun. 10, 2019

(87) PCT Pub. No.: WO2018/111637
PCT Pub. Date: Jun. 21, 2018

(65) Prior Publication Data
US 2020/0017677 A1    Jan. 16, 2020

Related U.S. Application Data

(60) Provisional application No. 62/433,365, filed on Dec. 13, 2016.

(51) Int. Cl.
*C08L 63/00* (2006.01)
*C08G 59/18* (2006.01)
(Continued)

(52) U.S. Cl.
CPC .............. *C08L 63/00* (2013.01); *B01J 33/00* (2013.01); *B01J 37/0219* (2013.01);
(Continued)

(58) Field of Classification Search
CPC ........ C08L 63/00–10; C09D 163/00–10; C09J 163/00–10; C08G 59/66; C08G 59/188;
(Continued)

(56) References Cited

U.S. PATENT DOCUMENTS 3,496,250 A    2/1970 Czerwinski
4,503,161 A    3/1985 Korbel
(Continued)

FOREIGN PATENT DOCUMENTS

EP    0138465    4/1985
EP    0193068    9/1986
(Continued)

OTHER PUBLICATIONS

International Search Report for PCT International Application No. PCT/US2017/064825 dated Feb. 23, 2018, 4 pages.

*Primary Examiner* — Kregg T Brooks
(74) *Attorney, Agent, or Firm* — Jean A. Lown

(57) ABSTRACT

A catalyst-containing particle including a core and an acidic coating layer thereon, wherein the core includes a nitrogen-containing catalyst for a thermoset polymeric system, and the acidic coating layer comprises a binder; and a method of making such particles. A curable, one-part epoxy/thiol resin composition that includes: an epoxy/thiol resin mixture including: an epoxy resin component that includes an epoxy resin having at least two epoxide groups per molecule; a thiol component that includes a polythiol compound having at least two primary thiol groups; and catalyst-containing particles dispersed in the epoxy/thiol resin mixture; wherein each particle includes a core and an acidic coating layer
(Continued)

thereon, wherein the core includes a nitrogen-containing catalyst for the epoxy resin; and a method of curing such curable composition.

18 Claims, 4 Drawing Sheets

(51) Int. Cl.
    *C08G 59/40*     (2006.01)
    *C08G 59/66*     (2006.01)
    *C08G 59/68*     (2006.01)
    *B01J 37/02*     (2006.01)
    *B01J 33/00*     (2006.01)

(52) U.S. Cl.
    CPC ........ *B01J 37/0221* (2013.01); *C08G 59/188* (2013.01); *C08G 59/4064* (2013.01); *C08G 59/66* (2013.01); *C08G 59/686* (2013.01)

(58) Field of Classification Search
    CPC ...... C08G 59/686; B01J 31/0235–0254; B01J 33/00; B01J 37/0215; B01J 37/0219; B01J 37/0221
    See application file for complete search history.

(56) References Cited

U.S. PATENT DOCUMENTS

| | | | |
|---|---|---|---|
| 4,546,155 A | 10/1985 | Hirose | |
| 5,077,376 A | 12/1991 | Dooley | |
| 5,430,112 A | 7/1995 | Sakata | |
| 5,464,910 A | 11/1995 | Nakatsuka | |
| 5,593,759 A | 1/1997 | Vargas | |
| 5,883,193 A | 3/1999 | Karim | |
| 6,506,494 B2 | 1/2003 | Brandys | |
| 6,653,371 B1 | 11/2003 | Burns | |
| 6,872,762 B2 | 3/2005 | Burns | |
| 7,927,514 B2 | 4/2011 | Kondo | |
| 8,084,519 B2 | 12/2011 | Okuno | |
| 9,067,395 B2 | 6/2015 | Plaut | |
| 9,422,411 B2 | 8/2016 | Sahouani | |
| 10,287,466 B2 | 5/2019 | DeMoss | |
| 2008/0227855 A1* | 9/2008 | Buckton | A61K 9/1635 514/462 |
| 2008/0249258 A1 | 10/2008 | Masuko | |
| 2013/0128435 A1 | 5/2013 | Mizuta | |
| 2013/0149531 A1 | 6/2013 | Kosal | |

FOREIGN PATENT DOCUMENTS

| | | |
|---|---|---|
| EP | 0590975 | 4/1994 |
| EP | 0950677 | 10/1999 |
| GB | 1121196 | 7/1968 |
| WO | WO 2011-126702 | 10/2011 |
| WO | WO 2016-105997 | 6/2016 |
| WO | WO 2016-130673 | 8/2016 |
| WO | WO 2017-189388 | 11/2017 |
| WO | WO 2018-109617 | 6/2018 |

* cited by examiner

EPOXY STABILIZATION USING ACID-COATED NITROGEN CONTAINING CATALYSTS, PARTICLES, AND METHODS

CROSS REFERENCE TO RELATED APPLICATION

This application is a national stage filing under 35 U.S.C. 371 of PCT/US2017/064825, filed Dec. 6, 2017, which claims the benefit of U.S. Provisional Patent Application No. 62/433,365, filed Dec. 13, 2016, the disclosure of which is incorporated by reference in their entirety.

BACKGROUND

Curable epoxy-based compositions are well known. Such compositions are used as adhesives, coating agents, sealing agents, and casting agents. Epoxy-based compositions are also used in the electronics industry, e.g., for cell phone assembly. Epoxy/polythiol-containing compositions conventionally have been used as two-part compositions. This was due at least in part to the instability of a one-part composition that includes an epoxy resin, a polythiol curing agent, and a liquid (soluble) tertiary amine catalyst. Such one-part compositions in which the epoxy resin, polythiol, and the catalyst are admixed at room temperature typically have working or "pot" lives on the order of minutes to a few hours. These properties impose practical restrictions on end-use applications of such compositions. Accordingly, many traditional epoxy/polythiol compositions have been formulated as two-part compositions.

Commercially available latent curing agents used in one-part epoxy resin adhesive formulations ordinarily provide such formulations with a combination of good storage stability and moderate reactivity at elevated temperatures. Examples of such commercially available latent curing agents include dicyandiamide and dibasic acid dihydrazide. These curing agents are useful in formulating epoxy resin compositions with excellent storage stability; however, to achieve cure, these curing agents ordinarily require heating to temperatures greater than 150° C. for extended periods of time.

In the electronics industry, it is desirable to provide epoxy-based compositions with thermal cure profiles tailored to specific application temperature requirements. Such cure profile tailoring assists in maintaining the integrity of the electronic components during the bonding process in, e.g., cell phone assembly. In addition, it is desirable for such compositions to have extended room temperature pot lives so that the composition may be applied to a larger number of parts over an extended period of time. This prolongs the useable application life of the compositions, thereby ensuring reproducible dispensing properties.

Advances in the electronics industry have made precise deposition of assembly adhesives a critical processing parameter, particularly in view of high throughput demand and process efficiency. The increasingly popular smaller-sized microelectronic components have made precise deposition of solder or adhesives for device assembly that much more important. Where precise adhesive deposition does not occur—either due to adhesive deposition technique imprecision, or spreading of the adhesive due to inappropriate rheological properties for the particular application, or both—surface mounting of components may not occur at all, and even when mounting does occur, the mounting may not occur in a commercially acceptable manner.

Heretofore, the desirability of balancing reactivity with pot life in curable one-part epoxy-based compositions has been recognized. Notwithstanding the state of the art, it is desirable to provide epoxy compositions with improved storage stability at room temperature, particularly with respect to viscosity maintenance over time, as well as with extended working lives at room temperature and relatively short curing times at elevated temperatures.

SUMMARY

The present disclosure relates to catalyst-containing particles, as well as curable, one-part epoxy-thiol resin compositions, and methods of making the particles and curing the compositions.

In one embodiment, the present disclosure provides catalyst-containing particles, wherein each particle includes a core and an acidic coating layer thereon, wherein the core includes a nitrogen-containing catalyst for a thermoset polymeric system, and the acidic coating layer includes a binder.

In another embodiment, the present disclosure provides a curable, one-part epoxy/thiol resin composition that includes: an epoxy/thiol resin mixture including: an epoxy resin component that includes an epoxy resin having at least two epoxide groups per molecule; a thiol component that includes a polythiol compound having at least two primary thiol groups; and catalyst-containing particles dispersed in the epoxy/thiol resin mixture; wherein each particle includes a core and an acidic coating layer thereon, wherein the core includes a nitrogen-containing catalyst for the epoxy resin, and the acidic coating layer includes a binder. This is a "one-part" composition that includes the thiol curing agent, the nitrogen-containing catalyst, and the epoxy resin in admixture.

Also provided are methods.

In one embodiment, a method of curing a curable, one-part epoxy/thiol resin composition is provided. The method includes: providing a curable, one-part epoxy/thiol resin composition as described herein; and heating the curable, one-part epoxy/thiol resin composition to a temperature of at least 50° C. In certain embodiments, the curable, one-part epoxy/thiol resin composition is heated to a temperature of up to 80° C. In certain embodiments, the curable, one-part epoxy/thiol resin composition is heated to a temperature of 60-65° C.

In another embodiment, a method of making particles is provided. The method includes: providing nitrogen-containing catalyst particles; providing an aqueous coating composition that includes an acid and a binder, or an acidic binder; combining the nitrogen-containing catalyst particles with the aqueous coating composition to form a slurry; and subjecting the slurry to conditions effective to form dried catalyst-containing particles; wherein each particle comprises a core and an acidic coating layer thereon, wherein the core includes a nitrogen-containing catalyst (for a thermoset polymeric system), and the acidic coating layer comprises a binder.

The "core" in a catalyst-containing particle of the present disclosure can be a single core particle or multiple core particles (i.e., an agglomerate of core particles).

The term "aliphatic" refers to C1-C40, suitably C1-C30, straight or branched chain alkenyl, alkyl, or alkynyl which may or may not be interrupted or substituted by one or more heteroatoms such as O, N, or S.

The term "cycloaliphatic" refers to cyclized aliphatic C3-C30 groups such as C3-C20 groups and includes those interrupted by one or more heteroatoms such as O, N, or S.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of "alkylene" groups include methylene, ethylene, 1,3-propylene, 1,2-propylene, 1,4-butylene, 1,4-cyclohexylene, and 1,4-cyclohexyldimethylene.

The term "aromatic" refers to C3-C40, suitably C3-C30, aromatic groups including both carbocyclic aromatic groups as well as heterocyclic aromatic groups containing one or more of the heteroatoms, O, N, or S, and fused ring systems containing one or more of these aromatic groups fused together.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring (e.g., phenylene). Optionally, the aromatic ring can have one or more additional carbocyclic rings that are fused to the aromatic ring. Any additional rings can be unsaturated, partially saturated, or saturated. Unless otherwise specified, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "haloalkyl" refers to an alkyl substituted one or more times by one or more halogens.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 22° C. to 25° C.

The term "in the range" or "within a range" (and similar statements) includes the endpoints of the stated range.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION

Figure 1:
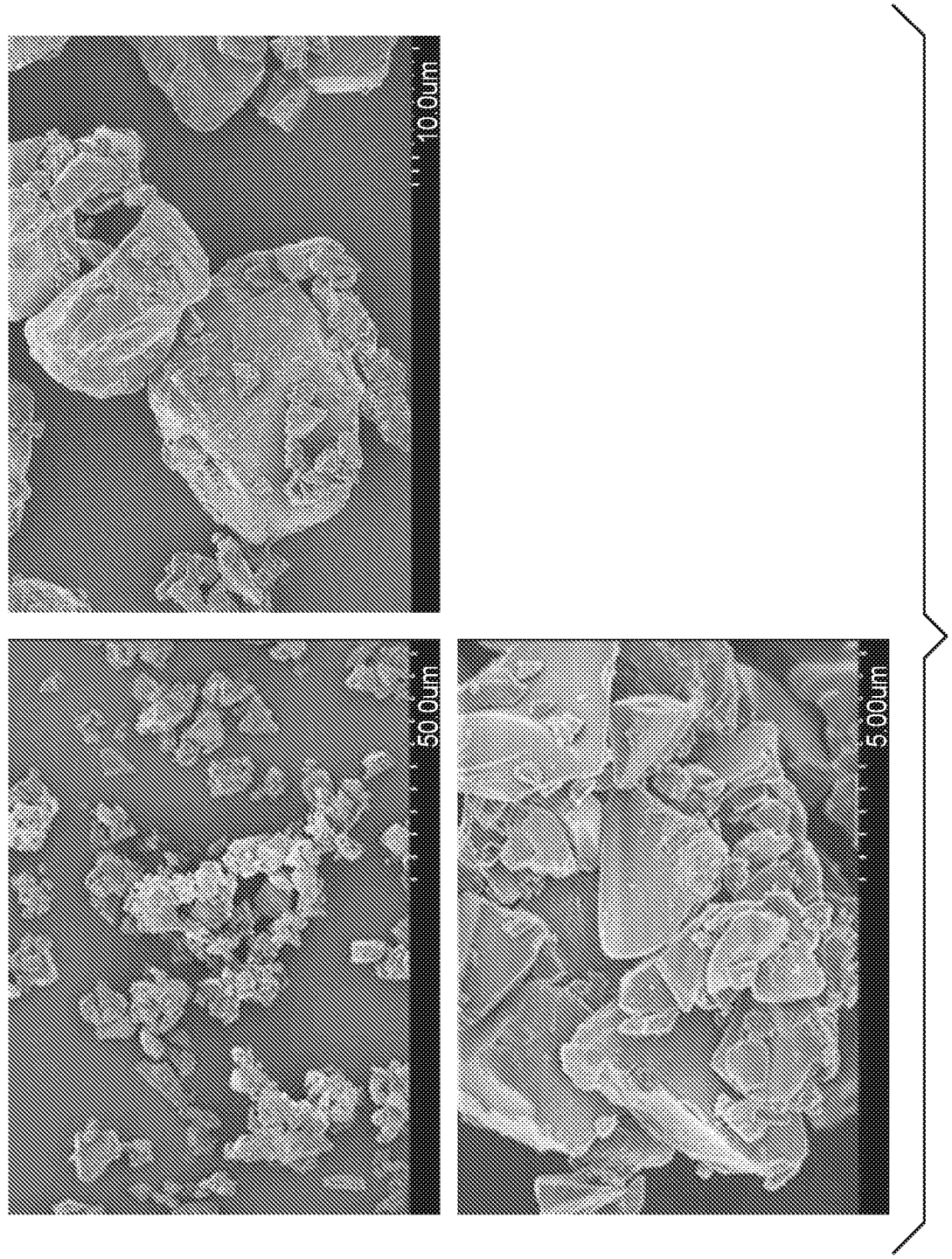
FIG. 1. Scanning Electron Microscope (SEM) micrographs of uncoated ANCAMINE 2442.

The present disclosure relates to catalyst-containing particles, as well as curable, one-part epoxy-thiol resin compositions, and methods of making the particles and curing the compositions.

The present disclosure provides catalyst-containing particles, wherein each particle includes a core and an acidic coating layer thereon, wherein the core includes a nitrogen-containing catalyst for a thermoset polymeric system, and the acidic coating layer includes a binder. Such catalyst-containing particles can be used in an epoxy/thiol resin composition, or in other thermoset cure systems in which a nitrogen-containing compound (e.g., an amine) can act as a catalyst.

The present disclosure also provides a curable, one-part epoxy/thiol resin composition that includes: an epoxy/thiol resin mixture including: an epoxy resin component that includes an epoxy resin having at least two epoxide groups per molecule; a thiol component that includes a polythiol compound having at least two primary thiol groups; and catalyst-containing particles dispersed in the epoxy/thiol resin mixture; wherein each particle includes a core and an acidic coating layer thereon, wherein the core includes a nitrogen-containing catalyst for the epoxy resin, and the acidic coating layer includes a binder. In this context "one-part" means that all components, including the thiol curing agent, the nitrogen-containing catalyst, and any optional additives are admixed with the epoxy resin.

The curable epoxy/thiol resin compositions of the present disclosure show improved storage stability at room temperature, particularly with respect to viscosity maintenance over time, as well as with extended working lives at room temperature and relatively short curing times at elevated temperatures. In certain embodiments, the curable epoxy/thiol resin compositions are stable at room temperature for a period of at least 2 weeks, at least 4 weeks, or at least 2 months. In this context, "stable" means that the epoxy/thiol composition remains in a curable form.

It is believed a coating on the nitrogen-containing catalyst prevents the nitrogen-containing catalyst and thiol curing agent from curing the epoxy resin (or any other thermoset polymer) for a period of time (e.g., at least 2 weeks) because the binder-containing coating physically protects the nitrogen-containing catalyst from diffusing out of the particles, and the acid neutralizes any prematurely diffused and dissolved nitrogen-containing catalyst.

To be released from the catalyst-containing particles and to react with the epoxy resin (or any other thermoset polymer), the nitrogen-containing catalyst typically diffuses through the coating layer positioned around the core particle. Diffusion may occur, for example, through an opening within the binder matrix of the coating layer, through defects in the coating layer, or by any other mechanism. The thickness and composition of the coating layer as well as the environment surrounding the catalyst-containing particle can affect the rate of diffusion of the catalyst through the coating layer.

Depending on the environment and other factors, the release may or may not occur immediately. That is, the onset of release of the nitrogen-containing catalyst may commence immediately or after a certain period of time. Once release commences, however, the amount of the nitrogen-containing catalyst released is usually greatest initially and then decreases over time.

The curable epoxy/thiol resin compositions also possess good low temperature curability. In certain embodiments, the curable epoxy/thiol resin composition is curable at a temperature of at least 50° C. In certain embodiments, the curable epoxy/thiol resin composition is curable at a temperature of up to 80° C. In certain embodiments, the curable epoxy/thiol composition is curable at a temperature of 60-65° C.

Thus, curable epoxy/thiol resin compositions of the present disclosure are suitable for use in temperature sensitive bonding applications, particularly in the electronics industry, e.g., in cell phone assembly and bonding of plastic and metal parts. They may also be used in a variety of other applications, such as in the automotive and aerospace industries for parts bonding.

Epoxy Resin Component

The epoxy resin component included in the curable epoxy/polythiol resin composition contains an epoxy resin that has at least two epoxy functional groups (i.e., oxirane groups) per molecule. As used herein, the term oxirane group refers to the following divalent group.

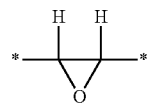

The asterisks denote a site of attachment of the oxirane group to another group. If an oxirane group is at the terminal position of the epoxy resin, the oxirane group is typically bonded to a hydrogen atom.

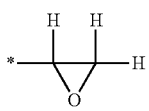

This terminal oxirane group is often part of a glycidyl group.

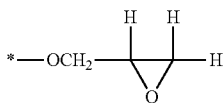

The epoxy resin includes a resin with at least two oxirane groups per molecule. For example, an epoxy compound can have 2 to 10, 2 to 6, or 2 to 4 oxirane groups per molecule. The oxirane groups are usually part of a glycidyl group.

Epoxy resins can include a single material or mixture of materials (e.g., monomeric, oligomeric, or polymeric compounds) selected to provide the desired viscosity characteristics before curing and to provide the desired mechanical properties after curing. If the epoxy resin includes a mixture of materials, at least one of the epoxy resins in the mixture is usually selected to have at least two oxirane groups per molecule. For example, a first epoxy resin in the mixture can have two to four or more oxirane groups and a second epoxy resin in the mixture can have one to four oxirane groups. In some of these examples, the first epoxy resin is a first glycidyl ether with two to four glycidyl groups and the second epoxy resin is a second glycidyl ether with one to four glycidyl groups.

The portion of the epoxy resin that is not an oxirane group (i.e., an epoxy resin compound minus the oxirane groups) can be aromatic, aliphatic, or a combination thereof and can be linear, branched, cyclic, or a combination thereof. The aromatic and aliphatic portions of the epoxy resin can include heteroatoms or other groups that are not reactive with the oxirane groups. That is, the epoxy resin can include halo groups, oxy groups such as in an ether linkage group, thio groups such as in a thio ether linkage group, carbonyl groups, carbonyloxy groups, carbonylimino groups, phosphono groups, sulfono groups, nitro groups, nitrile groups, and the like. The epoxy resin can also be a silicone-based material such as a polydiorganosiloxane-based material.

Although the epoxy resin can have any suitable molecular weight, the weight average molecular weight is usually at least 100 grams/mole, at least 150 grams/mole, at least 175 grams/mole, at least 200 grams/mole, at least 250 grams/mole, or at least 300 grams/mole. The weight average molecular weight can be up to 50,000 grams/mole or even higher for polymeric epoxy resins. The weight average molecular weight is often up to 40,000 grams/mole, up to 20,000 grams/mole, up to 10,000 grams/mole, up to 5,000 grams/mole, up to 3,000 grams/mole, or up to 1,000 grams/mole. For example, the weight average molecular weight can be in the range of 100 to 50,000 grams/mole, in the range of 100 to 20,000 grams/mole, in the range of 10 to 10,000 grams/mole, in the range of 100 to 5,000 grams/mole, in the range of 200 to 5,000 grams/mole, in the range of 100 to 2,000 grams/mole, in the range of 200 to 2,000 grams/mole, in the range of 100 to 1,000 grams/mole, or in the range of 200 to 1,000 grams/mole.

Suitable epoxy resins are typically a liquid at room temperature; however, solid epoxy resins that can be dissolved in one of the other components of the composition, such as a liquid epoxy resin, can be used if desired. In most embodiments, the epoxy resin is a glycidyl ether. Exemplary glycidyl ethers can be of Formula (I).

In Formula (I), group $R^1$ is a polyvalent group that is aromatic, aliphatic, or a combination thereof. Group $R^1$ can be linear, branched, cyclic, or a combination thereof. Group $R^1$ can optionally include halo groups, oxy groups, thio groups, carbonyl groups, carbonyloxy groups, carbonylimino groups, phosphono groups, sulfono groups, nitro groups, nitrile groups, and the like. Although the variable p can be any suitable integer greater than or equal to 2, p is often an integer in the range of 2 to 10, in the range of 2 to 6, or in the range of 2 to 4.

In some embodiments, the epoxy resin is a polyglycidyl ether of a polyhydric phenol, such as polyglycidyl ethers of bisphenol A, bisphenol F, bisphenol AD, catechol, and resorcinol. In some embodiments, the epoxy resin is a reaction product of a polyhydric alcohol with epichlorohydrin. Exemplary polyhydric alcohols include butanediol, polyethylene glycol, and glycerin. In some embodiments, the epoxy resin is an epoxidised (poly)olefinic resin, epoxidised phenolic novolac resin, epoxidised cresol novolac resin, and cycloaliphatic epoxy resin. In some embodiments, the epoxy resin is a glycidyl ether ester, such as that which can be obtained by reacting a hydroxycarboxylic acid with epichlorohydrin, or a polyglycidyl ester, such as that which can be obtained by reacting a polycarboxylic acid with epichlorohydrin. In some embodiments, the epoxy resin is a urethane-modified epoxy resin. Various combinations of two or more epoxy resins can be used if desired.

In some exemplary epoxy resins of Formula (I), the variable p is equal to 2 (i.e., the epoxy resin is a diglycidyl ether) and $R^1$ includes an alkylene (i.e., an alkylene is a divalent radical of an alkane and can be referred to as an alkane-diyl), heteroalkylene (i.e., a heteroalkylene is a divalent radical of a heteroalkane and can be referred to as a heteroalkane-diyl), arylene, or combination thereof. Suitable alkylene groups often have 1 to 20 carbon atoms, 1 to 12 carbon atoms, 1 to 8 carbon atoms, or 1 to 4 carbon atoms. Suitable heteroalkylene groups often have 2 to 50 carbon atoms, 2 to 40 carbon atoms, 2 to 30 carbon atoms, 2 to 20 carbon atoms, 2 to 10 carbon atoms, or 2 to 6 carbon atoms with 1 to 10 heteroatoms, 1 to 6 heteroatoms, or 1 to 4 heteroatoms. The heteroatoms in the heteroalkylene can be selected from oxy, thio, or —NH— groups but are often oxy groups. Suitable arylene groups often have 6 to 18 carbon atoms or 6 to 12 carbon atoms. For example, the arylene can be phenylene, fluorenylene, or biphenylene. Group $R^1$ can further optionally include halo groups, oxy groups, thio groups, carbonyl groups, carbonyloxy groups, carbonylimino groups, phosphono groups, sulfono groups, nitro groups, nitrile groups, and the like. The variable p is usually an integer in the range of 2 to 4.

Some epoxy resins of Formula (I) are diglycidyl ethers where $R^1$ includes (a) an arylene group or (b) an arylene group in combination with an alkylene, heteroalkylene, or both. Group $R^1$ can further include optional groups such as halo groups, oxy groups, thio groups, carbonyl groups, carbonyloxy groups, carbonylimino groups, phosphono groups, sulfono groups, nitro groups, nitrile groups, and the like. These epoxy resins can be prepared, for example, by reacting an aromatic compound having at least two hydroxyl groups with an excess of epichlorohydrin. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, and 9,9-(4-hydroxyphenol)fluorene. Still other examples include the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Some commercially available diglycidyl ether epoxy resins of Formula (I) are derived from bisphenol A (i.e., bisphenol A is 4,4'-dihydroxydiphenylmethane). Examples include, but are not limited to, those available under the trade designation EPON (e.g., EPON 1510, EPON 1310, EPON 828, EPON 872, EPON 1001, EPON 1004, and EPON 2004) from Momentive Specialty Chemicals, Inc. (Columbus, Ohio), those available under the trade designation DER (e.g., DER 331, DER 332, DER 336, and DER 439) from Olin Epoxy Co. (St. Louis, Mo.), and those available under the trade designation EPICLON (e.g., EPICLON 850) from Dainippon Ink and Chemicals, Inc. (Parsippany, N.J.). Other commercially available diglycidyl ether epoxy resins are derived from bisphenol F (i.e., bisphenol F is 2,2'-dihydroxydiphenylmethane). Examples include, but are not limited to, those available under the trade designation DER (e.g., DER 334) from Olin Epoxy Co. (St. Louis, Mo.), those under the trade designation EPICLON (e.g., EPICLON 830) from Dainippon Ink and Chemicals, Inc. (Parsippany, N.J.), and those available under the trade designation ARALDITE (e.g., ARALDITE 281) from Huntsman Corporation (The Woodlands, Tex.).

Other epoxy resins of Formula (I) are diglycidyl ethers of a poly(alkylene oxide) diol. These epoxy resins also can be referred to as diglycidyl ethers of a poly(alkylene glycol) diol. The variable p is equal to 2 and $R^1$ is a heteroalkylene having oxygen heteroatoms. The poly(alkylene glycol) portion can be a copolymer or homopolymer and often includes alkylene units having 1 to 4 carbon atoms. Examples include, but are not limited to, diglycidyl ethers of poly(ethylene oxide) diol, diglycidyl ethers of poly(propylene oxide) diol, and diglycidyl ethers of poly(tetramethylene oxide) diol. Epoxy resins of this type are commercially available from Polysciences, Inc. (Warminster, Pa.) such as those derived from a poly(ethylene oxide) diol or from a poly(propylene oxide) diol having a weight average molecular weight of 400 grams/mole, 600 grams/mole, or 1000 grams/mole.

Still other epoxy resins of Formula (I) are diglycidyl ethers of an alkane diol ($R^1$ is an alkylene and the variable p is equal to 2). Examples include a diglycidyl ether of 1,4-dimethanol cyclohexyl, diglycidyl ether of 1,4-butanediol, and a diglycidyl ether of the cycloaliphatic diol formed from a hydrogenated bisphenol A such as those commercially available under the trade designation EPONEX (e.g., EPONEX 1510) from Hexion Specialty Chemicals, Inc. (Columbus, Ohio) and under the trade designation EPALLOY (e.g., EPALLOY 5001) from CVC Thermoset Specialties (Moorestown, N.J.).

For some applications, the epoxy resins chosen for use in the curable coating compositions are novolac epoxy resins, which are glycidyl ethers of phenolic novolac resins. These resins can be prepared, for example, by reaction of phenols with an excess of formaldehyde in the presence of an acidic catalyst to produce the phenolic novolac resin. Novolac epoxy resins are then prepared by reacting the phenolic novolac resin with epichlorihydrin in the presence of sodium hydroxide. The resulting novolac epoxy resins typically have more than two oxirane groups and can be used to produce cured coating compositions with a high crosslinking density. The use of novolac epoxy resins can be particularly desirable in applications where corrosion resistance, water resistance, chemical resistance, or a combination thereof is desired. One such novolac epoxy resin is poly[(phenyl glycidyl ether)-co-formaldehyde]. Other suitable novolac resins are commercially available under the trade designation ARALDITE (e.g., ARALDITE GY289, ARALDITE EPN 1183, ARALDITE EP 1179, ARALDITE EPN 1139, and ARALDITE EPN 1138) from Huntsman Corporation (The Woodlands, Tex.), under the trade designation EPALLOY (e.g., EPALLOY 8230) from CVC Thermoset Specialties (Moorestown, N.J.), and under the trade designation DEN (e.g., DEN 424 and DEN 431) from Olin Epoxy Co. (St. Louis, Mo.).

Yet other epoxy resins include silicone resins with at least two glycidyl groups and flame retardant epoxy resins with at least two glycidyl groups (e.g., a brominated bisphenol-type epoxy resin having at least two glycidyl groups such as that commercially available from Dow Chemical Co. (Midland, Mich.) under the trade designation DER 580).

The epoxy resin component is often a mixture of materials. For example, the epoxy resins can be selected to be a mixture that provides the desired viscosity or flow characteristics prior to curing. For example, within the epoxy resin may be reactive diluents that include monofunctional or certain multifunctional epoxy resins. The reactive diluent should have a viscosity which is lower than that of the epoxy resin having at least two epoxy groups. Ordinarily, the reactive diluent should have a viscosity less than 250 mPa·s (cPs). The reactive diluent tends to lower the viscosity of the epoxy/polythiol resin composition and often has either a branched backbone that is saturated or a cyclic backbone that is saturated or unsaturated. Preferred reactive diluents have only one functional group (i.e., oxirane group) such as various monoglycidyl ethers. Some exemplary monofunctional epoxy resins include, but are not limited to, those with an alkyl group having 6 to 28 carbon atoms, such as (C6-C28)alkyl glycidyl ethers, (C6-C28)fatty acid glycidyl esters, (C6-C28)alkylphenol glycidyl ethers, and combinations thereof. In the event a monofunctional epoxy resin is the reactive diluent, such monofunctional epoxy resin should be employed in an amount of up to 50 parts based on the total of the epoxy resin component.

In some embodiments, the curable epoxy/thiol resin compositions typically include at least 20 weight percent (wt-%), at least 25 wt-%, at least 30 wt-%, at least 35 wt-%, at least 40 wt-%, or at least 45 wt-%, epoxy resin component, based on a total weight of the curable epoxy/thiol resin composition. If lower levels are used, the cured composition may not contain enough polymeric material (e.g., epoxy resin) to provide desired coating characteristics. In some embodiments, the curable epoxy/thiol resin compositions include up to 80 wt-%, up to 75 wt-%, or up to 70 wt-%, epoxy resin component, based on a total weight of the curable epoxy/thiol resin composition.

Thiol Component

A thiol is an organosulfur compound that contains a carbon-bonded sulfhydryl or mercapto (—C—SH) group. Suitable polythiols are selected from a wide variety of compounds that have two or more thiol groups per molecule, and that function as curatives for epoxy resins.

Examples of suitable polythiols include trimethylolpropane tris(beta-mercaptopropionate), trimethylolpropane tris(thioglycolate), pentaerythritol tetrakis(thioglycolate), pentaerythritol tetrakis(beta-mercaptopropionate), dipentaerythritol poly(beta-mercaptopropionate), ethylene glycol bis(beta-mercaptopropionate), a (C1-C12)alkyl polythiol (e.g., butane-1,4-dithiol and hexane-1,6-dithiol), a (C6-C12) aromatic polythiol (e.g., p-xylenedithiol and 1,3,5-tris (mercaptomethyl) benzene). Combinations of polythiols can be used if desired.

In some embodiments, the curable epoxy/thiol compositions typically include at least 25 wt-%, at least 30 wt-%, or at least 35 wt-%, thiol component, based on a total weight of the curable epoxy/thiol resin composition. In some embodiments, the curable epoxy/thiol resin compositions include up to 70 wt-%, up to 65 wt-%, up to 60 wt-%, up to 55 wt-%, up to 50 wt-%, up to 45 wt-%, or up to 40 wt-%, thiol component, based on a total weight of the curable epoxy/thiol resin composition. Various combinations of two or more polythiols can be used if desired.

In some embodiments, the ratio of the epoxy component to the thiol component in the curable epoxy/thiol resin compositions of the present disclosure is from 0.5:1 to 1.5:1, or 0.75:1 to 1.3:1 (epoxy:thiol equivalents).

Systems containing epoxy resins and polythiols suitable for use in the present disclosure are disclosed in U.S. Pat. No. 5,430,112 (Sakata et al.).

Particle Core—Nitrogen-Containing Catalyst

A catalyst-containing particle includes a core and an acidic coating layer thereon, wherein the core includes a nitrogen-containing catalyst for a thermoset polymeric system (e.g., an epoxy/thiol composition as disclosed herein), and the acidic coating layer includes a binder.

The nitrogen-containing catalysts are typically of the heat activated class. In certain embodiments, the nitrogen-containing catalysts are capable of activation at temperatures at or above 50° C. to effect the thermal curing of a thermoset polymer (e.g., an epoxy resin).

Suitable nitrogen-containing catalysts are typically solids at room temperature, and not soluble in the other components of the epoxy/thiol resin compositions of the present disclosure. In certain embodiments, the nitrogen-containing catalysts are in particle form having a particle size (i.e., the largest dimension of the particles, such as the diameter of a sphere) of at least 100 micrometers, and often up to 500 micrometers.

Particle size is selected to balance the rate of cure and the shelf life of the curable compositions. Typically, the smaller the particle size, the faster the rate of cure. Depending on the application, one of skill in the art can select an appropriate particle size. For example, if the curable composition is applied in a thin film, the particle size should be less than the film thickness.

As used herein, the term "nitrogen-containing catalyst" refers to any nitrogen-containing compound that catalyzes the curing of the epoxy resin. The term does not imply or suggest a certain mechanism or reaction for curing. The nitrogen-containing catalyst can directly react with the oxirane ring of the epoxy resin, can catalyze or accelerate the reaction of the polythiol compound with the epoxy resin, or can catalyze or accelerate the self-polymerization of the epoxy resin.

In certain embodiments, the nitrogen-containing catalysts are amine-containing catalysts. Some amine-containing catalysts have at least two groups of formula —NR$^2$H, wherein R$^2$ is selected from hydrogen, alkyl, aryl, alkaryl, or aralkyl. Suitable alkyl groups often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups usually have 6 to 12 carbon atoms such as a phenyl or biphenyl group. Suitable alkylaryl groups can include the same aryl and alkyl groups discussed above.

The nitrogen-containing catalyst minus the at least two amino groups (i.e., the portion of the catalyst that is not an amino group) can be any suitable aromatic group, aliphatic group, or combination thereof.

Exemplary nitrogen-containing catalysts for use herein include a reaction product of phthalic anhydride and an aliphatic polyamine, more particularly a reaction product of approximately equimolar proportions of phthalic acid and diethylamine triamine, as described in British Patent 1,121,196 (Ciba Geigy AG). A catalyst of this type is available commercially from Ciba Geigy AG under the tradename CIBA HT 9506.

Yet another type of nitrogen-containing catalyst is a reaction product of: (i) a polyfunctional epoxy compound; (ii) an imidazole compound, such as 2-ethyl-4-methylimidazole; and (iii) phthalic anhydride. The polyfunctional epoxy compound may be a compound having two or more epoxy groups in the molecule as described in U.S. Pat. No. 4,546,155 (Hirose et al.). A catalyst of this type is commercially available from Ajinomoto Co. Inc. (Tokyo, Japan) under the tradename AJICURE PN-23, which is believed to be an adduct of EPON 828 (bisphenol type epoxy resin epoxy equivalent 184-194, commercially available from Hexion Specialty Chemicals, Inc. (Columbus, Ohio)), 2-ethyl-4-methylimidazole, and phthalic anhydride.

Other suitable nitrogen-containing catalysts include the reaction product of a compound having one or more isocyanate groups in its molecule with a compound having at least one primary or secondary amino group in its molecule. Additional nitrogen-containing catalysts include 2-heptadeoylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2,4-diamino-8-2-methylimidazolyl-(1)-ethyl-5-triazine, or a combination thereof, as well as products of triazine with isocyanuric acid, succinohydrazide, adipohydrazide, isophtholohydrazide, o-oxybenzohydrazide, salicylohydrazide, or a combination thereof.

Nitrogen-containing catalysts are commercially available from sources such as Ajinomoto Co. Inc. (Tokyo, Japan) under the tradenames AMICURE MY-24, AMICURE GG-216 and AMICURE ATU CARBAMATE, from Hexion Specialty Chemicals, Inc. (Columbus, Ohio) under the tradename EPIKURE P-101, from T&K Toka (Chikumazawa, Miyoshi-Machi, Iruma-Gun, Saitama, Japan) under the tradenames FXR-1020, FXR-1081, and FXR-1121, from Shikoku (Marugame, Kagawa Prefecture, Japan) under the tradenames CUREDUCT P-2070 and P-2080, from Air Products and Chemicals (Allentown, Pa.) under the tradenames ANCAMINE 2441 and 2442, from AC Catalysts (Linden, N.J.) under the tradenames TECHNICURE LC80 and LC100), and from Asahi Kasei Kogyo, K.K. (Japan) under the tradename NOVACURE HX-372.

Other suitable nitrogen-containing catalysts are those described in U.S. Pat. No. 5,077,376 (Dooley et al.) and U.S. Pat. No. 5,430,112 (Sakata et al.) referred to as "amine adduct latent accelerators." Other exemplary nitrogen-containing catalysts are described, for example, in British Patent 1,121,196 (Ciba Geigy AG), European Patent Application No. 138465A (Ajinomoto Co.), and European Patent Application No. 193068A (Asahi Chemical).

Various combinations of two or more nitrogen-containing catalysts can be used if desired.

Particle Coating—Acidic Material

The acidic coating layer of the particles includes an acidic material and a binder, which may be the same or different. The acidic material is an organic acid selected from small molecule organic acids, acid-functional oligomers (e.g., acid-terminated oligomers), and acid-functional polymers (e.g., acid-terminated polymers) that are soluble or dispersible in water. In this context, "water-soluble" refers to a one phase system, and "water-dispersible" refers to a system having at least two phases that is sufficiently stable to allow for application to the particle core, e.g., by spray drying.

The water-soluble or water-dispersible organic acids which are suitable for use in the particle coating should have a pKa less than the pKa of the nitrogen-containing catalyst.

The amount of chosen acid is influenced by its hydrogen equivalent and degree of solubility. Certain combinations of acids (such as carboxylic acids and quinones) may show enhanced effects over acids used individually. In most embodiments, the acid is a Bronsted acid.

In certain embodiments, the acidic coating layer includes an acidic material selected from the group of a carboxylic acid, a quinone, a phenol, an enolizable material, a phosphoric acid, a sulfuric acid, and combinations thereof. In certain embodiments, the acidic material is a carboxylic acid.

The acidic material may be selected from carboxylic acids of general Formula (II):

$$R^4CO_2H$$

wherein:

$R^4$ is trans-$CH=CHCO_2H$, $-CH=CHCO_2(CH_3)$, $-CH_2C(OR^5)(CO_2R^6)CH_2CO_2R^7$ (wherein each $R^5$, $R^6$, and $R^7$ is independently H, (C1-C10)alkyl, or aryl), —(C11-C18)alkyl, —$(CH_2)_nCO_2H$ (wherein n is 1-9), —$(CHR^8)_n$ $CO_2H$ (wherein $R^8$ is H or OH, and n is 1 or 2), —$CH(OR^9)$ $R^{10}$ (wherein $R^9$ is H or (C1-C10)alkyl, and $R^{10}$ is (C1-C10) alkyl or phenyl), —CH=CH-aryl,

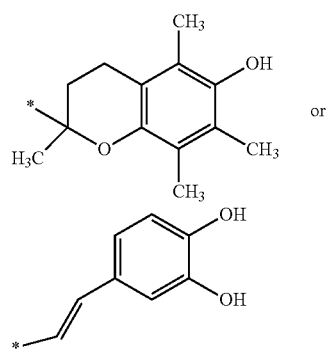

wherein the asterisks denote the sites of attachment of the $R^4$ groups.

Other suitable compounds are benzoic acids of general Formula (III):

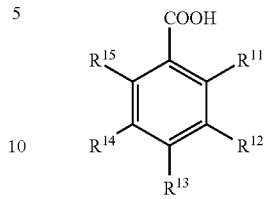

wherein:

$R^{11}$ is H, alkyl, haloakyl (such as —$CX_3$ wherein X is F, Cl, Br, I), alkenyl, aryl (e.g., phenyl), benzyl, —O-alkyl, —O-aryl (e.g., —O-phenyl), —O-benzyl, —S—S-arylene-$CO_2H$, —S—S-aryl (e.g., —S—S-phenyl), —SH, —S-alkyl, —S-haloalkyl, —S-aryl (e.g., —S-phenyl), —S-benzyl, —$CO_2H$, —$CO_2$-alkyl, —$CO_2$-aryl (e.g., —$CO_2$-phenyl), —$CO_2$-benzyl, —C(O)H, —C(O)-alkyl, —C(O)-aryl (e.g., —C(O)-phenyl), —C(O)-benzyl, or —$NO_2$;

$R^{12}$ is H, alkyl, haloalkyl (such as —$CX_3$ wherein X is F, Cl, Br, I), alkenyl, aryl (e.g., phenyl), benzyl, —O-alkyl, —O-aryl (e.g., —O-phenyl), —O-benzyl, —$CH_2$-arylene-$NO_2$, —$CO_2H$, —$CO_2$-alkyl, —$CO_2$-aryl (e.g., —$CO_2$-phenyl), —$CO_2$-benzyl, —C(O)H, —C(O)-alkyl, —C(O)-haloalkyl, —C(O)-aryl (e.g., —C(O)-phenyl), —C(O)-benzyl, or

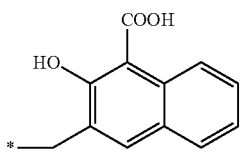 [SMILES: *Cc1cc2ccccc2c(C(=O)O)c1O]

wherein the asterisk denotes the site of attachment of the $R^{12}$ group;

$R^{13}$ is H, alkyl, haloalkyl (such as —$CX_3$ wherein X is F, Cl, Br, I), alkenyl, aryl (e.g., phenyl), benzyl, —OH, —O-alkyl, —O-aryl (e.g., —O-phenyl), —O-benzyl, —$CO_2H$, —$CO_2$-alkyl, —$CO_2$-aryl (e.g., —$CO_2$-phenyl), —$CO_2$-benzyl, —C(O)H, —C(O)-alkyl, —C(O)-aryl (e.g., —C(O)-phenyl), —C(O)-benzyl, or —$NO_2$;

$R^{14}$ is H, alkyl, haloalkyl (such as —$CX_3$ wherein X is F, Cl, Br, I), alkenyl, aryl (e.g., phenyl), benzyl, —O-alkyl, —O-aryl (e.g., —O-phenyl), —O-benzyl, —$CO_2H$, —$CO_2$-alkyl, —$CO_2$-aryl (e.g., —$CO_2$-phenyl), —$CO_2$-benzyl, —C(O)H, —C(O)-alkyl, —C(O)-aryl (e.g., —C(O)-phenyl), or —C(O)-benzyl; and $R^{15}$ is H, alkyl, haloalkyl (such as —$CX_3$ wherein X is F, Cl, Br, I), alkenyl, aryl (e.g., phenyl), benzyl, —OH, —O-alkyl, —O-aryl (e.g., —O-phenyl), —O-benzyl, —$CO_2H$, —$CO_2$-alkyl, —$CO_2$-aryl (e.g., —$CO_2$-phenyl), —$CO_2$-benzyl, —C(O)H, —C(O)-alkyl, —C(O)-aryl (e.g., —C(O)-phenyl), —C(O)-benzyl, or —$NO_2$.

Quinones of general Formula (IV) are also suitable for use in the acidic particle coating:

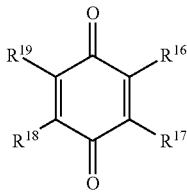

wherein:

$R^{16}$, $R^{17}$, $R^{18}$, and $R^{19}$ are independently H, alkyl, haloalkyl, alkenyl, aryl (e.g., phenyl), —OH, —O-alkyl, —O-aryl (e.g., —O-phenyl), —O-benzyl, or —CN.

Phenols of general Formula (V) are also suitable for use in the acidic particle coating:

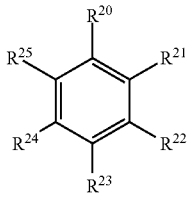

wherein:

$R^{20}$ is H or OH;

$R^{21}$ is H, alkyl, haloalkyl (such as —$CX_3$ wherein X is F, Br, Cl, I), alkenyl, —Cl, —F, —Br, —I, —CN, —OH, —O-alkyl, —O-aryl (e.g., —O-phenyl), —O-benzyl, —$NO_2$, —C(O)-alkyl, —C(O)-aryl (e.g., —C(O)-phenyl, —C(O)-benzyl, —C(O)H, —$CO_2$H, —$CO_2$-alkyl, —$CO_2$-aryl (e.g., —$CO_2$-phenyl), —$CO_2$-benzyl, or phenol;

$R^{22}$ is H, alkyl, haloalkyl (such as —$CX_3$ wherein X is F, Br, Cl, I), alkenyl, —OH, —O-alkyl, —O-aryl (e.g., —O-phenyl), —O-benzyl, aryl (e.g., phenyl), benzyl, —$CH_2$-aryl (e.g., —$CH_2$-phenyl), —CN, —F, —Cl, —Br, or —I;

$R^{23}$ is H, alkyl, haloalkyl (such as —$CX_3$ wherein X is F, Br, Cl, I), alkenyl, —$NO_2$, —C(O)-alkyl, —C(O)-aryl (e.g., —C(O)-phenyl), —C(O)-benzyl, —C(O)H, —$CO_2$-alkyl, —$CO_2$-aryl (e.g., —$CO_2$— phenyl), —$CO_2$-benzyl, —OH, —O-alkyl, —O-aryl (e.g., —O-phenyl), —O-benzyl, aryl (e.g., phenyl), benzyl, —$CH_2$-phenylene-OH, —$C(Me)_2$-phenylene-OH, —$CH_2$-aryl (e.g., —$CH_2$-phenyl), or

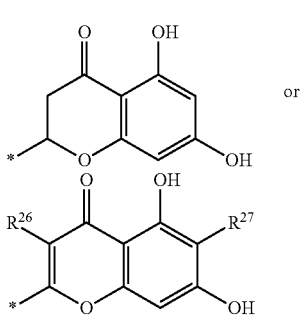

or wherein:

$R^{26}$ and $R^{27}$ are independently H, alkyl, haloalkyl (such as —$CX_3$ wherein X is F, Br, Cl, I), alkenyl, —OH, —O-alkyl, —O-aryl (e.g., —O-phenyl), or —O-benzyl; and the asterisk denotes the site of attachment of the $R^{12}$ group;

$R^{24}$ is H, alkyl, haloalkyl (such as —$CX_3$ wherein X is F, Br, Cl, I), alkenyl, —OH, —O-alkyl, —O-aryl (e.g., —O-phenyl), —O-benzyl, —F, —Cl, —Br, —I, —CN, phenyl, benzyl, or —$CH_2$-aryl (e.g., —$CH_2$-phenyl); and $R^{25}$ is H, alkyl, haloalkyl (such as —$CX_3$ wherein X is F, Br, Cl, I), alkenyl, —F, —Cl, —Br, —I, —CN, —OH, —O-alkyl, —O-aryl (e.g., —O-phenyl), —O-benzyl, —$NO_2$, —C(O)-alkyl, —C(O)-aryl (e.g., —C(O)-phenyl), —O-benzyl, —C(O)H, —$CO_2$H, —$CO_2$-alkyl, —$CO_2$-phenyl, —$CO_2$-benzyl, or -phenol;

provided that a compound of general Formula V is chosen to have at least one phenolic group present.

Enolizable materials such as those compounds of general Formula (VI) are also suitable for use in the acidic particle coating:

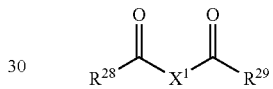

wherein:

$R^{28}$ or $R^{29}$ are independently $NR^{30}C(O)NR^{31}R^{32}$ (wherein $R^{30}$ is H, alkyl, aryl (e.g., phenyl); $R^{31}$ is H, alkyl, aryl (e.g., phenyl); $R^{32}$ is H, alkyl, aryl (e.g., phenyl), —OH, —O-alkyl, —O-aryl (e.g., —O-phenyl); and $X^1$ is —$(CH_2)_n$— (wherein n is 0-10), —$C(R^{33})_2$— (wherein $R^{33}$ is alkyl, aryl (e.g., phenyl), or —CN), —O—, —S—, or —$NR^{34}$— (wherein $R^{34}$ is H, alkyl, or aryl (e.g., phenyl)).

Enolizable materials such as those compounds of general Formula (VII) are also suitable for use in the acidic particle coating:

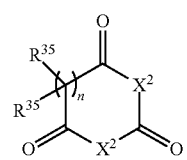

wherein:

each $R^{35}$ is independently hydrogen or alkyl but wherein at least one $R^{35}$ is hydrogen; each $X^2$ is independently N—$R^{36}$ where $R^{36}$ is H or alkyl; and n is equal to 0 (the cyclic structure is a five membered ring) or equal to 1 (the cyclic structure is a six membered ring).

In one example of Formula (VII), each $X^2$=NH, each $R^{35}$=H, and n=1. In another example, each $X^2$=N(CH$_3$), each $R^{35}$=H, and n=1. In yet another example, each $X^2$=NH and n=0.

Additionally, enolizable materials such as those compounds of general Formula (VIII) are also suitable for use in the acidic particle coating:

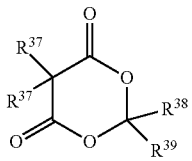

wherein:
each $R^{37}$ is independently hydrogen, alkyl, or aryl but wherein at least one $R^{37}$ is hydrogen; and each $R^{38}$ is independently alkyl.

In one example of Formula (VIII), each $R^{37}$=H and each $R^{38}$=CH$_3$. In another example, one $R^{37}$=H, the other $R^{37}$=phenyl, and each $R^{38}$=CH$_3$.

In certain embodiments, the acidic material may be, for example, selected from: 4-nitroguaiacol, 3,4,5-trimethoxy benzoic acid, hexachlorophene, 4,5,7-trihydroxyflavanone, phloroglucinol, fumaric acid, 3,4-dihydroxy benzoic acid, 3,4,5-trihydroxy benzoic acid, trolox, pamoic acid, ascorbic acid, citric acid, 3,4-dihydroxy cinnamic acid, 2,3-dicyanohydroquinone, barbituric acid, 1,3-dimethyl barbituric acid, tetrahydroxy-p-benzoquinone, parabanic acid, phenyl boronic acid, 5-phenyl Meldrum's acid, and Meldrum's acid.

Particle Coating—Binder

The acidic coating layer of the particles includes an acidic material and a binder, which may be the same or different.

The binder functions as a physical encapsulant/stabilizer. The water-soluble or water-dispersible organic acids which are suitable for use in the binder include those that allow release of the nitrogen-containing catalyst from the core particle through the coating layer. The binder materials may be soluble or dispersible in water. In this context, "water-soluble" refers to a one phase system, and "water-dispersible" refers to a system having at least two phases that is sufficiently stable to allow for application to the particle core, e.g., by spray drying.

The binder material is not tacky (i.e., the glass transition temperature is typically at least 20° C.). For example, the thermoplastic polymer is typically selected to be rubbery and not brittle. The thermoplastic polymer is typically a linear polymer and is not crosslinked or crosslinked to such a low amount that it can still be dissolved or dispersed in water.

The coating layer can be formed by deposition from an aqueous coating composition containing the binder and acidic material, which may be the same material. In such embodiments, the binder is dissolved in water. Alternatively, the coating layer can be formed by deposition from a coating dispersion containing the binder. In such embodiments, the binder is dispersed in water.

The amount of binder in the coating composition depends on its solubility in water, the desired viscosity of the solution, and the desired thickness of the coating layer. In many embodiments, the binder is present in an amount equal to at least 5 wt-%, at least 10 wt-%, or at least 15 wt-%, and up to 50 wt-%, up to 40 wt-%, up to 30 wt-%, or up to 20 wt-%, based on a total weight of the coating composition.

Examples of such binders include a (C1-C3)alkyl cellulose (e.g., methyl/propyl/ethyl celluloses); a hydroxyl (C1-C3)alkylcellulose (e.g., hydroxymethyl cellulose (i.e., hypromellose or HPMC), hydroxypropylmethyl cellulose, hydroxypropyl cellulose, and hydroxyethylcellulose); carboxy methylcellulose; sodium carboxymethylcellulose; polyoxazoline; a starch (e.g., pregelatinized starch and derivatized starch such as hydroxylated starch and carboxylated starch); a natural gum (e.g., acacia gum, sodium alginate, guar gum, xanthan gum); a thermoplastic polymer, a wax, or a combination thereof.

In certain embodiments, the coating layer includes a cellulose binder selected from a (C1-C3)alkyl cellulose (e.g., methyl/propyl/ethyl celluloses), a hydroxyl (C1-C3) alkyl cellulose (e.g., hydroxymethyl cellulose (i.e., hypromellose or HPMC), hydroxypropylmethyl cellulose, hydroxypropyl cellulose, and hydroxyethylcellulose), carboxy methylcellulose, sodium carboxymethylcellulose, or a combination thereof.

In other embodiments, the coating layer includes a wax. The wax can be a naturally occurring or synthetic material. Examples of waxes include, but are not limited to, animal waxes such as beeswax and lanolin, vegetable waxes such as Carnauba wax, petroleum waxes such as paraffin, and hydrogenated oils such as hydrogenated vegetable oils. Examples of hydrogenated oils include hydrogenated castor oil such as that commercially available under the trade designation CASTORWAX from Vertellus (Indianapolis, Ind.). Still other waxes are polyethylene such as those, for example, of formula $CH_3$—$(CH_2)_m$—$CH_3$ where m is in a range of 50 to 100.

In certain embodiments, wax dispersions typically contain a wax having a hydrophilic group that allows dispersion in water. Examples include dispersions of polyethylene, paraffin waxes, Carnauba wax, and the like. Such materials are commercially available under the trade designation SYNCERA from Paramelt (Muskegon, Mich.), under the trade designation LIQUITRON from Lubrizol Advanced Materials, Inc. (McCook, Ill.), and under the trade designation CARNAUBA MILK from Koster Keunen (Watertown, Conn.).

In certain embodiments, the thermoplastic polymer includes poly(vinyl pyrrolidone) (i.e., povidone of PVP), polyvinyl alcohol, a polyester, a polyamide, a copolymer of vinyl pyrrolidone and vinyl acetate, a (meth)acrylate-based thermoplastic polymer (e.g., a (meth)acrylate-based polymer with acidic groups, such as a copolymer of an alkyl (meth)acrylate and (meth)acrylic acid), a silicone-based thermoplastic polymer, an olefin-based thermoplastic polymer, a phenoxy resin (i.e., a polyhydroxy ether), and a styrene-based thermoplastic polymer (e.g., a polystyrene-acrylate-based latex polymer). The weight average molecular weight of such thermoplastic polymers is often at least 1,000 Daltons, at least 2,000 Daltons, at least 5,000 Daltons, or at least 10,000 Daltons. The weight average molecular weight can be up to 500,000 Daltons or higher. For example, the weight average molecular weight can be up to 300,000 Daltons, up to 200,000 Daltons, up to 100,000 Daltons, up to 50,000 Daltons, up to 20,000 Daltons. Some such thermoplastic polymers can be obtained, for example, from Polysciences, Inc. (Warrington, Pa.).

Exemplary silicone-based thermoplastic polymers include those described in International Publication No. WO 2016/105997 (Caruso Dailey et al.), including urea-based silicone copolymers, oxamide-based silicone copolymers, amide-based silicone copolymers, urethane-based silicone copolymers, or mixtures thereof. As used herein, the term "urea-based" refers to a segmented copolymer having at least one urea linkage, the term "oxamide-based" refers to a segmented copolymer having at least one oxamide linkage, the term "amide-based" refers to a segmented copolymer having at least one amide linkage, the term "urethane-based" refers to a segmented copolymer having at least one urethane linkage.

Another class of thermoplastic polymers for use in coating compositions are alkyl (meth)acrylate-based polymers that are water dispersible (i.e., latex-based (meth)acrylate polymers). Suitable alkyl methacrylates tend to have a higher glass transition temperature than alkyl acrylates and so may be more suitable for use in preparation of the alkyl (meth)acrylate-based polymer. However, some alkyl acrylates can be included in the (meth)acrylate as long as the glass transition temperature is at least 40° C., at least 50° C., at least 60° C., at least 80° C., or at least 100° C. Specific examples of (meth)acrylate polymers include various homopolymers such as, for example, poly(methyl methacrylate), poly(ethyl methacrylate), and polybutyl methacrylate as well as various copolymers such as, for example, poly(butyl methacrylate)-co-poly(isobutyl methacrylate) and the like. Such polymers can be obtained, for example, from Polysciences, Inc. (Warrington, Pa.).

Any suitable molecular weight can be used for the (meth)acrylate-based polymer. The molecular weight should be high enough to form a film but not so high that the (meth)acrylate-based polymer is difficult to dissolve or disperse in water or that the resulting solution has a viscosity that is too high for deposition on the core particles. The weight average molecular weight is often at least 1,000 Daltons (grams/mole), at least 2,000 Daltons, at least 5,000 Daltons, at least 10,000 Daltons, or at least 20,000 Daltons. The weight average molecular weight can be, for example, up to 500,000 Daltons or higher, up to 400,000 Daltons, up to 200,000 Daltons, or up to 100,000 Daltons.

Olefin-based polymers are yet another class of thermoplastic polymers that can be used in coating compositions. In many embodiments, the olefin-based polymers are polyethylene, polypropylene, polybutylene, or copolymers thereof. In some embodiments, the olefin-based polymers are polyethylene such as low density polyethylene (LDPE) or high density polyethylene (HDPE). These polymers can have any suitable molecular weight that can be dispersed or dissolved in water. In some embodiments, the weight average molecular weight of the dispersed olefin-based polymer is at least 2,000 grams/mole, at least 5,000 grams/mole, at least 10,000 grams/mole, at least 20,000 grams/mole, or at least 50,000 grams/mole. The weight average molecular weight can be up to 500,000 grams/mole or higher, up to 200,000 grams/mole, or up to 100,000 grams/mole. These materials can be obtained under the trade designation SYNCERA from Paramelt (Muskegon, Mich.), under the trade designation LIQUITRON from Lubrizol Advanced Materials, Inc. (McCook, Ill.).

An example water-based dispersion of a thermoplastic polymer contains phenoxy resin (polyhydroxy ethers) such as those formed from epichlorohydrin and Bisphenol A. Such water-based dispersions are commercially available from InChem (Rock Hill, S.C.) under the trade designations PKHW (e.g., PKHW 34, PKHW 35, and PKHW 38) and PKHP (e.g., PKHP 200).

Optional Surfactant in Particle Coating

In certain embodiments, a nonionic surfactant may also be included in the coating layer. The nonionic surfactant usually helps wet the surface of the nitrogen-containing catalysts during the coating process and/or stabilizes a coating composition if it is in the form of a dispersion.

A wide variety of nonionic surfactants can be used. The nonionic surfactant is selected to be soluble in the aqueous coating composition. The nonionic surfactant often has one or more hydroxyl groups or ether linkages (e.g., —$CH_2$—O—$CH_2$—) in one portion of the molecule that can hydrogen bond with other components of the reaction mixture.

Suitable nonionic surfactants include, but are not limited to, alkyl glucosides, alkyl glucamides, alkyl polyglucosides, polyethylene glycol alkyl ethers, block copolymers of polyethylene glycol and polypropylene glycol, and polysorbates. Examples of suitable alkyl glucosides include, but are not limited to, octyl glucoside (also referred to as octyl-beta-D-glucopyranoside) and decyl glucoside (also referred to as decyl-beta-D-glucopyranoside). Examples of suitable alkyl glucamides include, but are not limited to, octanoyl-N-methylglucamide, nonanoyl-N-methylglucamide, and decanoyl-N-methylglucamide. These surfactants can be obtained, for example, from Sigma Aldrich (St. Louis, Mo.) or Spectrum Chemicals (New Brunswick, N.J.). Examples of suitable alkyl polyglucosides include, but are not limited to, those commercially available from Cognis Corporation (Cincinnati, Ohio) under the trade designation APG (e.g., APG 325) and those commercially available from Dow Chemical (Midland, Mich.) under the trade designation TRITON (e.g., TRITON BG-10 and TRITON CG-110). Examples of polyethylene glycol alkyl ethers include, but are not limited to, those commercially available under the trade designation BRIJ (e.g., BRIJ 58 and BRIJ 98) from Sigma Aldrich (St. Louis, Mo.). Examples of block copolymers of polyethylene glycol and polypropylene glycol include, but are not limited to, those commercially available under the trade designation PLURONIC from BASF (Florham Park, N.J.). Examples of polysorbates include, but are not limited to those commercially available under the trade designation TWEEN from Croda (Mill Hall, Pa.).

The surfactant can be present in any suitable amount. Often, the surfactant is present in an amount equal to at least 0.1 wt-%, at least 0.5 wt-%, at least 1 wt-%, or at least 2 wt-%, based on a total weight of the aqueous coating composition. The surfactant can be present in an amount up to 15 wt-%, up to 12 wt-%, or up to 10 wt-%, based on a total weight of the first phase. For example, the surfactant is often present in the coating composition in an amount in a range of 0.1 to 15 wt-%, in a range of 1 to 12 wt-%, in a range of 0.1 to 10 wt-%, or in a range of 1 to 10 wt-%, based on the total weight of the aqueous coating composition.

Preparation of Coated Particles

Any suitable method can be used to deposit the coating around the core particle. The aqueous coating composition (e.g., coating solution or coating dispersion) is mixed with the core particles. Such mixture (i.e., a slurry) is then subjected to conditions effective to form dried catalyst-containing particles as described herein.

In many techniques, the slurry can be formed into particles (e.g., by atomization), and then the particles can be dried (e.g., in a spray chamber). In other techniques, the slurry can be dried (e.g., in a tray), and then formed into particles (e.g., by crushing or milling).

For many embodiments of the particles, the coating layer surrounds the core particle as a shell layer. Stated differently, such particles are core-shell particles. Prior to release of the nitrogen-containing catalyst, the particles have a core-shell structure with the core particles containing the nitrogen-containing catalyst. In some embodiments, the shell layer (coating layer) surrounds a single core particle. In other embodiments, however, the shell surrounds multiple core particles (i.e., an agglomerate of core particles). That is, the particle contains multiple core particles within a common shell layer (coating layer).

The core particles are not tacky. This increases the likelihood that multiple core particles will not adhere together before or during application of the coating layer. That is, the lack of tackiness of the core particles increases the likelihood that the coating layer will be positioned around a single core particle rather than around multiple core particles.

The coating layer is formed by mixing an aqueous coating composition (e.g., coating solution or coating dispersion) with the core particle. The coating composition can have any desired percent solids that allow good mixing with the core particles. In many embodiments, the maximum percent solids often correspond to the coating composition (e.g., solution or dispersion) having the highest viscosity that can be pumped. High solids can be desirable because less water needs to be removed during the process of forming the coating layer. If the percent solids value is too high, however, it is more likely that the coating layer will surround multiple core particles. In many embodiments, dilute coating compositions are used to increase the likelihood of forming particles containing a single core particle.

The coating composition often contains at least 5 wt-%, at least 10 wt-%, at least 15 wt-%, or at least 20 wt-% solids. The weight percent solids corresponds to the weight percent binder in the coating composition. The weight percent solids can be up to 70 wt-% or even higher, up to 60 wt-%, up to 50 wt-%, up to 40 wt-%, or up to 30 wt-%. For example, the weight percent solids can be in a range of 10 wt-% to 70 wt-%, 20 wt-% to 60 wt-%, 20 wt-% to 50 wt-%, or 20 wt-% to 40 wt-%.

Spray drying (spray coating and drying) or similar processes such as fluidized bed coating and drying that can result in the formation of a coating layer with relatively uniform thickness around the core particles is often considered to be preferable. If conditions are selected appropriately, these processes can be used to provide particles having a single rather than multiple core particles. That is, the catalyst-containing particles have a core-shell arrangement with a coating layer around a single core particle.

With spray drying, the core particles are mixed with the coating composition (e.g., coating solution or coating dispersion) to form a slurry. This slurry is then pumped to a drying chamber that contains an atomizer (to form droplets) and a drying gas. Some common types of atomizers include a rotary wheel (centrifugal) atomizer, a single-fluid/pressure nozzle (hydraulic) atomizer, a two-fluid nozzle (pneumatic) atomizer, and an ultrasonic atomizer. The product, which is the dried catalyst-containing particles, can be collected by various means such as by gravity or by using a cyclone, filter and bag, electrostatic separation, or the like.

Although a variety of suitable atomization processes can be used, two-fluid nozzle atomizers are often used. With these atomizers, a primary fluid (e.g., the slurry) is pumped through a small orifice and a second fluid, which is typically air or nitrogen but could be any suitable gas, is supplied near the small orifice to further atomize the primary fluid. Increasing the ratio of the secondary fluid to the primary fluid usually decreases the slurry droplet size and increases the likelihood of having a single core particle within the coating layer.

The two-fluid system may have either internal mixing (the second fluid is introduced into the primary fluid before exiting the final orifice) or external mixing (the second fluid is introduced after the primary fluid exits the final orifice). Multiple different configurations can be used for introducing the second fluid relative to the primary fluid. For example, the configuration can be a round spray (concentric ring of the second fluid surrounding the primary fluid orifice), conical/hollow spray, angle/flat spray, swirl spray, or the like. Atomizers with these different configurations are available from various suppliers such as Spraying Systems Co. (Wheaton, Ill.).

Numerous options can be used for the flow of the bulk drying gas into and out of the drying chamber. To maintain sufficient thermal energy and to provide a drying gas with sufficient drying capacity (e.g., low dew point), the drying gas is usually continuously cycled through the drying chamber. The main classes of flow patterns of the drying gas relative to the atomized droplets (input material) are co-current flow, counter-current flow, and mixed flow. Co-current flow involves the input material travelling in the same direction as the bulk drying gas; this is often embodied as input material travelling downward immediately after atomization (e.g., being sprayed downward) along with the downward-travelling bulk drying gas. Co-current is usually good for temperature-sensitive systems because the hot drying gas is cooled by the drying droplets, so the solid materials never experience the temperature of the hot incoming drying gas. Counter-current flow involves the input material travelling in the opposite direction to the bulk drying gas; this is often embodied as input material travelling downward immediately after atomization (e.g., being sprayed downward) while the bulk drying gas is travelling upward. This flow is often used for the most efficient drying. Mixed flow is a combination of co- and counter-current flow, where the input material is travelling in the same direction as the bulk drying gas in some regions, but in the opposite direction in other regions. Most often this flow pattern is seen when the input material is being atomized in an upward direction, where the input material initially travels upward from the energy imparted on it by atomization, but is subsequently pulled downward by gravity. Because the input material travels in two directions, the bulk drying gas will travel with the input material in some places and against the input material in others, regardless of whether the bulk drying gas is traveling downward or upward. Mixed flow can be advantageous because of the higher residence times in the drying chamber it provides to the drying solids.

The drying temperature is usually selected based on the composition of the core particles and the aqueous coating composition. In many embodiments, the bulk drying gas at the outlet of the drying chamber has a temperature near the boiling point of the dispersion medium (i.e., water) used in the slurry (in the coating composition) to ensure that adequate drying occurs. This does result, however, in the dried solids reaching a temperature that is near the boiling point of the water. In most instances, this can be beneficial because it minimizes residual liquids, which can lead to improved flowability, and reduction of unnecessary mass.

For some particles, however, it may be undesirable to use such a high drying temperature. This can be the situation, for example, where any component of the particles has a glass transition temperature, melting temperature, or decomposition temperature near the boiling point of the water contained in the slurry. In particular, care must be taken to prevent or minimize release of the nitrogen-containing catalyst from the particle. In such a situation, the drying temperature is typically reduced below that where any undesirable alteration of the catalyst-containing particle can occur. Drying can be accomplished at lower temperatures, for example, by increasing the residence time in the drying chamber, increasing the flow rate of the drying gas, decreasing the evaporative load, or modifying the various flow patterns.

Multiple coating layers can be positioned around the core particle. Often, multiple layers are added to provide a thicker coating layer or to alter the release characteristics of the nitrogen-containing catalyst from the catalyst-containing particle. If multiple coating layers are used, they are usually selected to be compatible with each other. In many embodiments, the same acidic material and binder is used to form the multiple coating layers.

The coating layer can have any desired thickness. In some embodiments, the thickness is at least 0.1 micrometer, at least 0.2 micrometer, at least 0.5 micrometer, at least 0.75 micrometer, or at least 1.0 micrometer. The thickness can be up to 5 micrometers or more, up to 4 micrometers, up to 3 micrometers, or up to 2 micrometers. The release profile of the nitrogen-containing catalyst within the catalyst-containing particle usually can be controlled by the thickness of the coating layer. That is, the greater the thickness, the slower the release rate of the nitrogen-containing catalyst through the coating layer. On the other hand, the release rate of the nitrogen-containing catalyst can be increased by decreasing the coating layer thickness. The thickness is frequently in a range of 0.1 to 5 micrometers, in a range of 0.1 to 3 micrometers, in a range of 0.5 to 5 micrometers, in a range of 0.5 to 3 micrometers, in a range of 1 to 5 micrometers, in a range of 1 to 3 micrometers, in a range of 0.1 to 2 micrometers, in a range of 0.5 to 2 micrometers, or in a range of 1 to 2 micrometers.

As an alternative to spray drying or similar processes, a mixture of the core particles and either the coating composition or the coating dispersion can be spread out into a thin layer for drying purposes. Any suitable drying method can be used. The dried layer can then be broken apart to provide the catalyst-containing particles. For example, the dried layer can be placed within a blender or dry mill to separate the particles from each other. The percent solids in the thin layer are typically relatively low to decrease the likelihood of having multiple core particles within the same catalyst-containing particle. This method can be used when relatively uniform coating layer thicknesses are not necessary or where a variety of coating thicknesses may be desired to provide a wider distribution of release rates for nitrogen-containing catalyst. Additionally, this method can be used when it may be beneficial to have multiple core particles surrounded by the same coating layer to provide a distribution of release rates.

In certain embodiments, the nitrogen-containing catalyst is present in a catalyst-containing particle in an amount of at least 50 wt-%, at least 55 wt-%, or at least 60 wt-%, based on total weight of the particle. In certain embodiments, the nitrogen-containing catalyst is present in a catalyst-containing particle in an amount of up to 80 wt-%, up to 75 wt-%, or up to 70 wt-%, based on the total weight of the particle.

In certain embodiments, the coating layer is present in a catalyst-containing particle in an amount of at least 20 wt-%, at least 25 wt-%, or at least 30 wt-%, based on the total weight of the particle. In certain embodiments, the coating layer is present in a catalyst-containing particle in an amount of up to 50 wt-%, up to 45 wt-%, up to 40 wt-%, based on the total weight of the particle.

In certain embodiments, the coating layer includes 100 wt-% acidic material in the form of one or more acidic binders. That is, the acidic material and the binder are the same material.

In certain embodiments, the coating layer includes acidic material in the form of one or more small molecule organic acids and one or more separate neutral binders. In certain of such embodiments, the coating layer includes at least 1 wt-% acidic material, and up to 99 wt-% neutral binder, based on the total weight of the coating layer. In certain of such embodiments, the coating layer includes up to 20 wt-% acidic material, and at least 80 wt-% neutral binder, based on the total weight of the coating layer.

Optional Additives in the Curable Composition

In addition to the epoxy resin component, the thiol component, and the coated particles, the curable composition can include various optional additives. One such optional additive is a toughening agent. Toughening agents can be added to provide the desired overlap shear, peel resistance, and impact strength. Useful toughening agents are polymeric materials that may react with the epoxy resin and that may be cross-linked. Suitable toughening agents include polymeric compounds having both a rubbery phase and a thermoplastic phase or compounds which are capable of forming, with the epoxide resin, both a rubbery phase and a thermoplastic phase on curing. Polymers useful as toughening agents are preferably selected to inhibit cracking of the cured epoxy composition.

Some polymeric toughening agents that have both a rubbery phase and a thermoplastic phase are acrylic core-shell polymers wherein the core is an acrylic copolymer having a glass transition temperature below 0° C. Such core polymers may include polybutyl acrylate, polyisooctyl acrylate, polybutadiene-polystyrene in a shell comprised of an acrylic polymer having a glass transition temperature above 25° C., such as polymethylmethacrylate. Commercially available core-shell polymers include those available as a dry powder under the trade designations ACRYLOID KM 323, ACRYLOID KM 330, and PARALOID BTA 731, from Dow Chemical Co., and KANE ACE B-564 from Kaneka Corporation (Osaka, Japan). These core-shell polymers may also be available as a predispersed blend with a diglycidyl ether of bisphenol A at, for example, a ratio of 12 to 37 parts by weight of the core-shell polymer and are available under the trade designations KANE ACE (e.g., KANE ACE MX 157, KANE ACE MX 257, and KANE ACE MX 125) from Kaneka Corporation (Japan).

Another class of polymeric toughening agents that are capable of forming, with the epoxide group-containing material, a rubbery phase on curing, are carboxyl-terminated butadiene acrylonitrile compounds. Commercially available carboxyl-terminated butadiene acrylonitrile compounds include those available under the trade designations HYCAR (e.g., HYCAR 1300X8, HYCAR 1300X13, and HYCAR 1300X17) from Lubrizol Advanced Materials, Inc. (Cleveland, Ohio) and under the trade designation PARALOID (e.g., PARALOID EXL-2650) from Dow Chemical (Midland, Mich.).

Other polymeric toughening agents are graft polymers, which have both a rubbery phase and a thermoplastic phase, such as those disclosed in U.S. Pat. No. 3,496,250 (Czerwinski). These graft polymers have a rubbery backbone having grafted thereto thermoplastic polymer segments. Examples of such graft polymers include, for example, (meth)acrylate-butadiene-styrene, and acrylonitrile/butadiene-styrene polymers. The rubbery backbone is preferably prepared so as to constitute from 95 wt-% to 40 wt-% of the total graft polymer, so that the polymerized thermoplastic portion constitutes from 5 wt-% to 60 wt-% of the graft polymer.

Still other polymeric toughening agents are polyether sulfones such as those commercially available from BASF (Florham Park, N.J.) under the trade designation ULTRASON (e.g., ULTRASON E 2020 P SR MICRO).

The curable composition can additionally contain a non-reactive plasticizer to modify rheological properties. Commercially available plasticizers include those available under the trade designation BENZOFLEX 131 from Eastman Chemical (Kingsport, Tenn.), JAYFLEX DINA available from ExxonMobil Chemical (Houston, Tex.), and PLASTOMOLL (e.g., diisononyl adipate) from BASF (Florham Park, N.J.).

The curable composition optionally contains a flow control agent or thickener, to provide the desired rheological characteristics to the composition. Suitable flow control agents include fumed silica, such as treated fumed silica, available under the trade designation CAB-O-SIL TS 720, and untreated fumed silica available under the trade designation CAB-O-SIL M5, from Cabot Corp. (Alpharetta, Ga.).

In some embodiments, the curable composition optimally contains adhesion promoters to enhance the bond to the substrate. The specific type of adhesion promoter may vary depending upon the composition of the surface to which it will be adhered. Adhesion promoters that have been found to be particularly useful for surfaces coated with ionic type lubricants used to facilitate the drawing of metal stock during processing include, for example, dihydric phenolic compounds such as catechol and thiodiphenol.

The curable composition optionally may also contain one or more conventional additives such as fillers (e.g., aluminum powder, carbon black, glass bubbles, talc, clay, calcium carbonate, barium sulfate, titanium dioxide, silica such as fused silica, silicates, glass beads, and mica), pigments, flexibilizers, reactive diluents, non-reactive diluents, fire retardants, antistatic materials, thermally and/or electrically conductive particles, and expanding agents including, for example, chemical blowing agents such as azodicarbonamide or expandable polymeric microspheres containing a hydrocarbon liquid, such as those sold under the trade designation EXPANCEL by Expancel Inc. (Duluth, Ga.). Particulate fillers can be in the form of flakes, rods, spheres, and the like. Additives are typically added in amounts to produce the desired effect in the resulting adhesive.

The amount and type of such additives may be selected by one skilled in the art, depending on the intended end use of the composition.

Preparation and Use of Curable Composition

The catalyst-containing particles are mixed with the epoxy resin component, the thiol component, and one or more optional additives (e.g., nonionic surfactant). While any suitable amount of the catalyst-containing particles can be combined with the epoxy resin component and the thiol component, the amount is typically dependent on the amount and type of nitrogen-based catalyst in the catalyst-containing particle.

In many embodiments, the amount of catalyst-containing particles included in the composition is at least 0.1 wt-%, based on the total weight of the curable composition. If lower amounts are used, there may be an insufficient amount of the nitrogen-containing catalyst to polymerize the epoxy resin. The amount of the catalyst-containing particles can be, for example, at least 0.5 wt-%, at least 1 wt-%, at least 2 wt-%, or at least 5 wt-%, based on the total weight of the curable composition. The amount of the catalyst-containing particles can be up to 35 wt-%, based on the total weight of the curable composition. If the amount of the catalyst-containing particles is higher, the final cured composition may be too soft (it may have lower than the desired amount of strength integrity). The amount of the catalyst-containing particles can be, for example, up to 30 wt-%, up to 25 wt-%, up to 20 wt-%, up to 15 wt-%, or up to 10 wt-%. In some example embodiments, the amount is in a range of 0.1 to 35 wt-%, in a range of 0.5 to 35 wt-%, in a range of 0.5 to 30 wt-%, in a range of 0.5 to 25 wt-%, in a range of 0.5 to 20 wt-%, in a range of 0.5 to 10 wt-%, in a range of 1 to 30 wt-%, in a range of 1 to 20 wt-%, or in a range of 1 to 10 wt-%.

In many embodiments, the curable composition is positioned between two substrates and then heated to cause diffusion of the nitrogen-containing catalyst from the coated particle. The heating may soften or melt the coating layer of the coated particle further enhancing diffusion of the nitrogen-containing catalyst from the coated particle. Upon diffusion from the coated particle, the nitrogen-containing catalyst contacts the epoxy resin in the curable composition. If the conditions are suitable for reaction, the nitrogen-containing catalyst can react with the epoxy resin resulting in the formation of a cured composition. Conditions suitable for reaction include, for example, having a sufficient concentration of nitrogen-containing catalyst mixed with the epoxy resin and having a sufficient temperature for curing the epoxy resin.

Substrates can be selected from various materials depending on the application. Materials useful for substrates include, but are not limited to, metals, ceramics, glasses, composite materials, polymeric materials, and the like. Metals useful as substrates include, but are not limited to, aluminum and steel, such as high strength steel, stainless steel, galvanized steel, cold-rolled steel, and surface-treated metals. Surface treatments include, but are not limited to, paints, oil draw lubricants or stamping lubricants, electrocoats, powder coats, primers, chemical and physical surface treatments, and the like. Composites useful as substrates in the present disclosure include, but are not limited to, glass reinforced composites and carbon reinforced composites. Polymeric materials useful as substrates in the present disclosure include, but are not limited to, nylon, polycarbonate, polyester, (meth)acrylate polymers and copolymers, acrylonitrile-butadiene-styrene copolymers, and the like.

In yet another aspect, a method of forming a cured composition is provided. The method includes providing a curable composition, heating the curable composition to release the nitrogen-containing catalyst from the coated particle, and forming a cured composition by reacting the nitrogen-containing catalyst with the epoxy resin. The curable compositions are the same as described above and include an epoxy/thiol resin composition and a coated particle mixed with the epoxy/thiol resin composition. The coated particle contains 1) a nitrogen-containing catalyst particle core, and 2) a coating layer around the core, wherein the coating layer comprises an acidic material and a binder.

The formation of the coated particle containing the nitrogen-containing catalyst allows for the preparation of a one part curable composition. That is, all of the components of the curable composition can be mixed together and then heated for reactivity (i.e., formation of the cured compositions). The curable composition can be stored for at least 2 weeks, at least 1 month, at least 2 months, or more prior to formation of the cured composition. The time of curing often can be selected by controlling the temperature in which the curable composition is stored.

EXEMPLARY EMBODIMENTS

Catalyst-Containing Particles

Embodiment 1A is a catalyst-containing particle comprising a core and an acidic coating layer thereon, wherein the core comprises a nitrogen-containing catalyst for a thermoset polymeric system, and the acidic coating layer comprises a binder.

Embodiment 2A is the catalyst-containing particle of embodiment 1A wherein the nitrogen-containing catalyst is solid at room temperature.

Embodiment 3A is the catalyst-containing particle of embodiment 1A or 2A wherein the nitrogen-containing catalyst is capable of activation at temperatures at or above 50° C. to affect the thermal curing of the thermoset system.

Embodiment 4A is the catalyst-containing particle of any one of the preceding embodiments wherein the nitrogen-containing catalyst is an amine-containing catalyst.

Embodiment 5A is the catalyst-containing particle of embodiment 4A wherein the amine-containing catalyst has at least two groups of formula —NR$^2$H, wherein R$^2$ is selected from hydrogen, alkyl, aryl, alkaryl, or aralkyl.

Embodiment 6A is the catalyst-containing particle of embodiment 5A wherein the amine-containing catalyst comprises a reaction product of phthalic anhydride and an aliphatic polyamine.

Embodiment 7A is the catalyst-containing particle of embodiment 5A wherein the amine-containing catalyst comprises a reaction product of: (i) a polyfunctional epoxy compound; (ii) an imidazole compound, such as 2-ethyl-4-methylimidazole; and (iii) phthalic anhydride.

Embodiment 8A is the catalyst-containing particle of embodiment 5A wherein the amine-containing catalyst comprises a reaction product of a compound having one or more isocyanate groups in its molecule with a compound having at least one primary or secondary amino group in its molecule.

Embodiment 9A is the catalyst-containing particle of embodiment 5A wherein the amine-containing catalyst comprises 2-heptadeoylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2,4-diamino-8-2-methylimidazolyl-(1)-ethyl-5-triazine, or a combination thereof.

Embodiment 10A is the catalyst-containing particle of embodiment 5A wherein the amine-containing catalyst comprises products of triazine with isocyanuric acid, succinohydrazide, adipohydrazide, isophtholohydrazide, o-oxybenzohydrazide, salicylohydrazide, or a combination thereof.

Embodiment 11A is the catalyst-containing particle of any one of the preceding embodiments wherein the nitrogen-containing catalyst is present in a catalyst-containing particle in an amount of at least 50 wt-%, at least 55 wt-%, or at least 60 wt-%, based on total weight of the particle.

Embodiment 12A is the catalyst-containing particle of any one of the preceding embodiments wherein the nitrogen-containing catalyst is present in a catalyst-containing particle in an amount of up to 80 wt-%, up to 75 wt-%, or up to 70 wt-%, based on the total weight of the particle.

Embodiment 13A is the catalyst-containing particle of any one of the preceding embodiments wherein the coating layer is present in a catalyst-containing particle in an amount of at least 20 wt-%, at least 25 wt-%, or at least 30 wt-%, based on the total weight of the particle.

Embodiment 14A is the catalyst-containing particle of any one of the preceding embodiments wherein the coating layer is present in a catalyst-containing particle in an amount of up to 50 wt-%, up to 45 wt-%, up to 40 wt-%, based on the total weight of the particle.

Embodiment 15A is the catalyst-containing particle of any one of the preceding embodiments wherein the acidic coating layer comprises an acidic material selected from small molecule organic acids, acid-functional oligomers (e.g., acid-terminated oligomers), and acid-functional polymers (e.g., acid-functional polymers) that are soluble or dispersible in water.

Embodiment 16A is the catalyst-containing particle of any one of the preceding embodiments wherein the acidic coating layer comprises an acidic material selected from the group of a carboxylic acid, a quinone, a phenol, an enolizable material, a phosphoric acid, a sulfuric acid, and combinations thereof.

Embodiment 17A is the catalyst-containing particle of embodiment 16A wherein the acidic material comprises a carboxylic acid of general Formula (II):

wherein:
R$^4$ is trans-CH=CHCO$_2$H, —CH=CHCO$_2$(CH$_3$), —CH$_2$C(OR$^5$)(CO$_2$R$^6$)CH$_2$CO$_2$R$^7$ (wherein each R$^5$, R$^6$, and R$^7$ is independently H, (C1-C10)alkyl, or aryl), —(C11-C18)alkyl, —(CH$_2$)$_n$CO$_2$H (wherein n is 1-9), —(CHR$^8$)$_n$CO$_2$H (wherein R$^8$ is H or —OH, and n is 1 or 2), —CH(OR$^9$)R$^{10}$ (wherein R$^9$ is H or (C1-C10)alkyl, and R$^{10}$ is (C1-C10)alkyl or phenyl), —CH=CH-aryl,

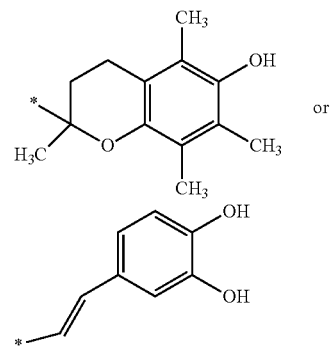

wherein the asterisks denote the sites of attachment of the R$^4$ groups.

Embodiment 18A is the catalyst-containing particle of embodiment 16A wherein the acidic material comprises a benzoic acid of general Formula (III):

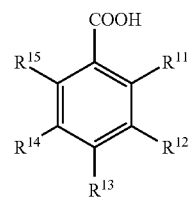

wherein:
R$^{11}$ is H, alkyl, haloakyl (such as —CX$_3$ wherein X is F, Cl, Br, I), alkenyl, aryl (e.g., phenyl), benzyl, —O-alkyl, —O-aryl (e.g., —O-phenyl), —O-benzyl, —S—S-arylene-CO$_2$H, —S—S-aryl (e.g., —S—S-phenyl), —SH, —S-alkyl, —S-haloalkyl, —S-aryl (e.g., —S-phenyl), —S-benzyl, —CO$_2$H,
—CO$_2$-alkyl, —CO$_2$-aryl (e.g., —CO$_2$-phenyl), —CO$_2$-benzyl, —C(O)H, —C(O)-alkyl, —C(O)-aryl (e.g., —C(O)-phenyl), —C(O)-benzyl, or —NO$_2$;

$R^{12}$ is H, alkyl, haloalkyl (such as —$CX_3$ wherein X is F, Cl, Br, I), alkenyl, aryl (e.g., phenyl), benzyl, —O-alkyl, —O-aryl (e.g., —O-phenyl), —O-benzyl, —$CH_2$-arylene-$NO_2$, —$CO_2H$, —$CO_2$-alkyl, —$CO_2$-aryl (e.g., —$CO_2$-phenyl), —$CO_2$-benzyl, —C(O)H, —C(O)-alkyl, —C(O)-haloalkyl, —C(O)-aryl (e.g., —C(O)-phenyl), —C(O)-benzyl, or

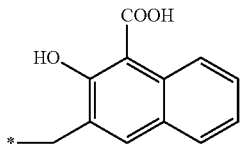 [SMILES: *Cc1cc2ccccc2c(C(=O)O)c1O]

wherein the asterisk denotes the site of attachment of the $R^{12}$ group;

$R^{13}$ is H, alkyl, haloalkyl (such as —$CX_3$ wherein X is F, Cl, Br, I), alkenyl, aryl (e.g., phenyl), benzyl, —OH, —O-alkyl, —O-aryl (e.g., —O-phenyl), —O-benzyl, —$CO_2H$, —$CO_2$-alkyl, —$CO_2$-aryl (e.g., —$CO_2$-phenyl), —$CO_2$-benzyl, —C(O)H, —C(O)-alkyl, —C(O)-aryl (e.g., —C(O)-phenyl), —C(O)-benzyl, or —$NO_2$;

$R^{14}$ is H, alkyl, haloalkyl (such as —$CX_3$ wherein X is F, Cl, Br, I), alkenyl, aryl (e.g., phenyl), benzyl, —O-alkyl, —O-aryl (e.g., —O-phenyl), —O-benzyl, —$CO_2H$, —$CO_2$-alkyl, —$CO_2$-aryl (e.g., —$CO_2$-phenyl), —$CO_2$-benzyl, —C(O)H, —C(O)-alkyl, —C(O)-aryl (e.g., —C(O)-phenyl), or —C(O)-benzyl; and $R^{15}$ is H, alkyl, haloalkyl (such as —$CX_3$ wherein X is F, Cl, Br, I), alkenyl, aryl (e.g., phenyl), benzyl, —OH, —O-alkyl, —O-aryl (e.g., —O-phenyl), —O-benzyl, —$CO_2H$, —$CO_2$-alkyl, —$CO_2$-aryl (e.g., —$CO_2$-phenyl), —$CO_2$-benzyl, —C(O)H, —C(O)-alkyl, —C(O)-aryl (e.g., —C(O)-phenyl), —C(O)-benzyl, or —$NO_2$.

Embodiment 19A is the catalyst-containing particle of embodiment 16A wherein the acidic material comprises a quinone of general Formula (IV):

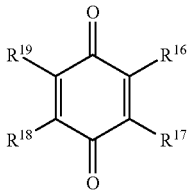

wherein:

$R^{16}$, $R^{17}$, $R^{18}$, and $R^{19}$ are independently H, alkyl, haloalkyl, alkenyl, aryl (e.g., phenyl), —OH, —O-alkyl, —O-aryl (e.g., —O-phenyl), —O-benzyl, or —CN.

Embodiment 20A is the catalyst-containing particle of embodiment 16A wherein the acidic material comprises a phenol of general Formula (V):

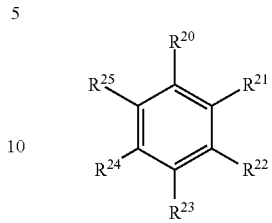

wherein:

$R^{20}$ is H or OH;

$R^{21}$ is H, alkyl, haloalkyl (such as —$CX_3$ wherein X is F, Br, Cl, I), alkenyl, —Cl, —F, —Br, —I, —CN, —OH, —O-alkyl, —O-aryl (e.g., —O-phenyl), —O-benzyl, —$NO_2$, —C(O)-alkyl, —C(O)-aryl (e.g., —C(O)-phenyl), —C(O)-benzyl, —C(O)H, —$CO_2H$, —$CO_2$-alkyl, —$CO_2$-aryl (e.g., —$CO_2$-phenyl), —$CO_2$-benzyl, or phenol;

$R^{22}$ is H, alkyl, haloalkyl (such as —$CX_3$ wherein X is F, Br, Cl, I), alkenyl, —OH, —O-alkyl, —O-aryl (e.g., —O-phenyl), —O-benzyl, aryl (e.g., phenyl), benzyl, —$CH_2$-aryl (e.g., —$CH_2$-phenyl), —CN, —F, —Cl, —Br, or —I;

$R^{23}$ is H, alkyl, haloalkyl (such as —$CX_3$ wherein X is F, Br, Cl, I), alkenyl, —$NO_2$, —C(O)-alkyl, —C(O)-aryl (e.g., —C(O)-phenyl), —C(O)-benzyl, —C(O)H, —$CO_2$-alkyl, —$CO_2$-aryl (e.g., —$CO_2$-phenyl), —$CO_2$-benzyl, —OH, —O-alkyl, —O-aryl (e.g., —O-phenyl), —O-benzyl, aryl (e.g., phenyl), benzyl, —$CH_2$-phenylene-OH, —$C(Me)_2$-phenylene-OH, —$CH_2$-aryl (e.g., —$CH_2$-phenyl), or

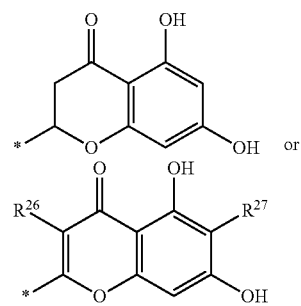

wherein:

$R^{26}$ and $R^{27}$ are independently H, alkyl, haloalkyl (such as —$CX_3$ wherein X is F, Br, Cl, I), alkenyl, —OH, —O-alkyl, —O-aryl (e.g., —O-phenyl), or —O—benzyl; and the asterisk denotes the site of attachment of the $R^{12}$ group;

$R^{24}$ is H, alkyl, haloalkyl (such as —$CX_3$ wherein X is F, Br, Cl, I), alkenyl, —OH, —O-alkyl, —O-aryl (e.g., —O-phenyl), —O-benzyl, —F, —Cl, —Br, —I, —CN, phenyl, benzyl, or —$CH_2$-aryl (e.g., —$CH_2$-phenyl); and $R^{25}$ is H, alkyl, haloalkyl (such as —$CX_3$ wherein X is F, Br, Cl, I), alkenyl, —F, —Cl, —Br, —I, —CN, —OH, —O-alkyl, —O-aryl (e.g., —O-phenyl), —O-benzyl, —$NO_2$, —C(O)-alkyl, —C(O)-aryl (e.g., —C(O)-phenyl), —O-benzyl, —C(O)H, —$CO_2H$, —$CO_2$-alkyl, —$CO_2$-phenyl, —$CO_2$-benzyl, or -phenol;

provided that a compound of general Formula V is chosen to have at least one phenolic group present.

Embodiment 21A is the catalyst-containing particle of embodiment 16A wherein the acidic material comprises an enolizable material of general Formula (VI):

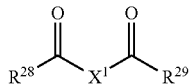

wherein:

$R^{28}$ or $R^{29}$ are independently $NR^{30}C(O)NR^{31}R^{32}$ (wherein $R^{30}$ is H, alkyl, aryl (e.g., phenyl); $R^{31}$ is H, alkyl, aryl (e.g., phenyl); $R^{32}$ is H, alkyl, aryl (e.g., phenyl), —OH, —O-alkyl, —O-aryl (e.g., —O-phenyl); and $X^1$ is —$(CH_2)_n$— (wherein n is 0-10), —$C(R^{33})_2$— (wherein $R^{33}$ is alkyl, aryl (e.g., phenyl), or —CN), —O—, —S—, or —$NR^{34}$— (wherein $R^{34}$ is H, alkyl, or aryl (e.g., phenyl)).

Embodiment 22A is the catalyst-containing particle of embodiment 16A wherein the acidic material comprises an enolizable material of general Formula (VII):

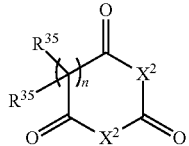

wherein: each $R^{35}$ is independently hydrogen or alkyl but wherein at least one $R^{35}$ is hydrogen; each $X^2$ is independently N—$R^{36}$ where $R^{36}$ is H or alkyl; and n is equal to 0 (the cyclic structure is a five membered ring) or equal to 1 (the cyclic structure is a six membered ring). In one example of Formula (VII), each $X^2$=NH, each $R^{35}$=H, and n=1. In another example, each $X^2$=N(CH$_3$), each $R^{35}$=H, and n=1. In yet another example, each $X^2$=NH and n=0.

Embodiment 23A is the catalyst-containing particle of embodiment 16A wherein the acidic material comprises an enolizable material of general Formula (VIII):

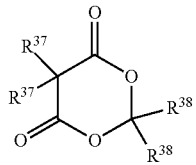

wherein: each $R^{37}$ is independently hydrogen, alkyl, or aryl but wherein at least one $R^{37}$ is hydrogen; and each $R^{38}$ is independently alkyl.

In one example of Formula (VIII), each $R^{37}$=H and each $R^{38}$=CH$_3$. In another example, one $R^{37}$=H, the other $R^{37}$=phenyl, and each $R^{38}$=CH$_3$.

Embodiment 24A is the catalyst-containing particle of any one of the preceding embodiments wherein the coating layer comprises at least 1 wt-% acidic material in the form of one or more small molecule organic acids, based on the total weight of the coating layer.

Embodiment 25A is the catalyst-containing particle of any one of the preceding embodiments wherein the coating layer includes up to 20 wt-% acidic material in the form of one or more small molecule organic acids, based on the total weight of the coating layer.

Embodiment 26A is the catalyst-containing particle of any one of the preceding embodiments wherein the binder is soluble or dispersible in water.

Embodiment 27A is the catalyst-containing particle of any one of the preceding embodiments wherein the binder is selected from: a (C1-C3)alkyl cellulose (e.g., methyl/propyl/ethyl celluloses); a hydroxyl (C1-C3)alkylcellulose (e.g., hydroxymethyl cellulose (i.e., hypromellose or HPMC), hydroxypropylmethyl cellulose, hydroxypropyl cellulose, and hydroxyethylcellulose); carboxy methylcellulose; sodium carboxymethylcellulose; polyoxazoline; a starch (e.g., pregelatinized starch and derivatized starch such as hydroxylated starch and carboxylated starch); a natural gum (e.g., acacia gum, sodium alginate, guar gum, xanthan gum); a thermoplastic polymer; a wax; or a combination thereof.

Embodiment 28A is the catalyst-containing particle of embodiment 27A wherein the binder is a starch (e.g., pregelatinized starch and derivatized starch such as hydroxylated starch and carboxylated starch).

Embodiment 29A is the catalyst-containing particle of embodiment 28A wherein the binder is a carboxylated starch that is acidic and functions as both the binder and an acidic material.

Embodiment 30A is the catalyst-containing particle of embodiment 27A wherein the binder is a wax.

Embodiment 31A is the catalyst-containing particle of embodiment 30A wherein the wax is a naturally occurring or synthetic material.

Embodiment 32A is the catalyst-containing particle of embodiment 31A wherein the wax is an animal wax (e.g., beeswax and lanolin), a vegetable wax (e.g., Carnauba wax), a petroleum wax (e.g., paraffin, and hydrogenated oils such as hydrogenated vegetable oils), or a combination thereof.

Embodiment 33A is the catalyst-containing particle of embodiment 31A wherein the wax includes a hydrophilic group.

Embodiment 34A is the catalyst-containing particle of embodiment 27A wherein the binder is a thermoplastic polymer.

Embodiment 35A is the catalyst-containing particle of embodiment 34A wherein the thermoplastic polymer comprises poly(vinylpyrrolidone) (i.e., povidone of PVP); polyvinyl alcohol; a polyester, a polyamide, a copolymer of vinylpyrrolidone and vinyl acetate, a (meth)acrylate-based thermoplastic polymer (e.g., (meth)acrylate-based polymers with acidic groups, such as copolymers of an alkyl (meth) acrylate and (meth)acrylic acid), a silicone-based thermoplastic polymer, an olefin-based thermoplastic polymer, a phenoxy resin (polyhydroxy ethers), a styrene-based thermoplastic polymer (e.g., polystyrene-acrylate-based latex polymers), or a combination thereof.

Embodiment 36A is the catalyst-containing particle of embodiment 27A wherein the binder is a cellulose selected from a (C1-C3)alkyl cellulose (e.g., methyl/propyl/ethyl celluloses), a hydroxyl (C1-C3)alkylcellulose (e.g., hydroxymethyl cellulose (i.e., hypromellose or HPMC), hydroxypropylmethyl cellulose, hydroxypropyl cellulose, and hydroxyethylcellulose), carboxy methylcellulose, sodium carboxymethylcellulose, or a combination thereof.

Embodiment 37A is the catalyst-containing particle of any one of the preceding embodiments wherein the coating layer comprises at least 80 wt-% neutral binder, based on the total weight of the coating layer.

Embodiment 38A is the catalyst-containing particle of any one of the preceding embodiments wherein the coating layer comprises up to 99 wt-% neutral binder, based on the total weight of the coating layer.

Embodiment 39A is the catalyst-containing particle of any of embodiments 1A through 37A wherein the coating layer comprises 100 wt-% of one or more acidic binders.

Embodiment 40A is the catalyst-containing particle of any one of the preceding embodiments further comprising a nonionic surfactant in the coating layer.

Curable Composition

Embodiment 1B is a curable, one-part epoxy/thiol resin composition comprising: an epoxy/thiol resin mixture comprising: an epoxy resin component comprising an epoxy resin having at least two epoxide groups per molecule; a thiol component comprising a polythiol compound having at least two primary thiol groups; and catalyst-containing particles dispersed in the epoxy/thiol resin mixture; wherein each particle comprises a core and an acidic coating layer thereon, wherein the core comprises a nitrogen-containing catalyst for the epoxy resin, and the acidic coating layer comprises a binder.

Embodiment 2B is the curable, one-part epoxy/thiol resin composition of embodiment 1B which is curable at a temperature of at least 50° C.

Embodiment 3B is the curable, one-part epoxy/thiol resin composition of embodiment 1B or 2B which is curable at a temperature of up to 80° C.

Embodiment 4B is the curable, one-part epoxy/thiol resin composition of any one of the preceding embodiments wherein the epoxy resin comprises a polyglycidyl ether of a polyhydric phenol, a reaction product of a polyhydric alcohol with epichlorohydrin, an epoxidised (poly)olefinic resin, an epoxidised phenolic novolac resin, an epoxidised cresol novolac resin, a cycloaliphatic epoxy resin, a glycidyl ether ester, a polyglycidyl ester, a urethane modified epoxy resin, or a combination of two or more thereof.

Embodiment 5B is the curable, one-part epoxy/thiol resin composition of any one of the preceding embodiments wherein the epoxy component further comprises a reactive diluent.

Embodiment 6B is the curable, one-part epoxy/thiol resin composition of embodiment 5B wherein the reactive diluent has a viscosity of less than 250 mPa·s (cPs).

Embodiment 7B is the curable, one-part epoxy/thiol resin composition of embodiment 5B or 6B wherein the reactive diluent is a monofunctional epoxy resin.

Embodiment 8B is the curable, one-part epoxy/thiol resin composition of embodiment 7B wherein the monofunctional epoxy resin comprises a (C6-C28)alkyl group.

Embodiment 9B is the curable, one-part epoxy/thiol resin composition of embodiment 8B wherein the monofunctional epoxy resin comprises (C6-C28)alkyl glycidyl ethers, (C6-C28)fatty acid glycidyl esters, (C6-C28)alkylphenol glycidyl ethers, or combinations thereof.

Embodiment 10B is the curable, one-part epoxy/thiol resin composition of any one of the preceding embodiments wherein the epoxy resin component is present in an amount of at least 20 wt-%, at least 25 wt-%, at least 30 wt-%, at least 35 wt-%, at least 40 wt-%, or at least 45 wt-%, based on the total weight of the curable epoxy/thiol resin composition.

Embodiment 11B is the curable, one-part epoxy/thiol resin composition of any one of the preceding embodiments wherein the epoxy resin component is present in an amount of up to 80 wt-%, up to 75 wt-%, or up to 70 wt-%, based on the total weight of the curable epoxy/thiol resin composition.

Embodiment 12B is the curable, one-part epoxy/thiol resin composition of any one of the preceding embodiments wherein the polythiol compound comprises trimethylolpropane tris(beta-mercaptopropionate), trimethylolpropane tris (thioglycolate), pentaerythritol tetrakis(thioglycolate), pentaerythritol tetrakis(beta-mercaptopropionate), dipentaerythritol poly(beta-mercaptopropionate), ethylene glycol bis(beta-mercaptopropionate), a (C1-C12)alkyl polythiol, a (C6-C12)aromatic polythiol, or a combination of two or more thereof.

Embodiment 13B is the curable, one-part epoxy/thiol resin composition of any one of the preceding embodiments wherein the thiol component is present in an amount of at least 25 wt-%, at least 30 wt-%, or at least 35 wt-%, thiol component, based on a total weight of the curable epoxy/thiol resin composition.

Embodiment 14B is the curable, one-part epoxy/thiol resin composition of any one of the preceding embodiments wherein the thiol component is present in an amount of up to 70 wt-%, up to 65 wt-%, up to 60 wt-%, up to 55 wt-%, up to 50 wt-%, up to 45 wt-%, or up to 40 wt-%, thiol component, based on a total weight of the curable epoxy/thiol resin composition.

Embodiment 15B is the curable, one-part epoxy/thiol resin composition of any one of the preceding embodiments wherein the epoxy resin component and the thiol component are present in a ratio of from 0.5:1 to 1.5:1, or 0.75:1 to 1.3:1 (epoxy:thiol equivalents).

Embodiment 16B is the curable, one-part epoxy/thiol resin composition of any one of the preceding embodiments wherein the nitrogen-containing catalyst is solid at room temperature.

Embodiment 17B is the curable, one-part epoxy/thiol resin composition of any one of the preceding embodiments wherein the nitrogen-containing catalyst is capable of activation at temperatures at or above 50° C. to affect the thermal curing of the epoxy resin.

Embodiment 18B is the curable, one-part epoxy/thiol resin composition of any one of the preceding embodiments wherein the nitrogen-containing catalyst is an amine-containing catalyst.

Embodiment 19B is the curable, one-part epoxy/thiol resin composition of embodiment 18B wherein the amine-containing catalyst has at least two groups of formula —$NR^2H$, wherein $R^2$ is selected from hydrogen, alkyl, aryl, alkaryl, or aralkyl.

Embodiment 20B is the curable, one-part epoxy/thiol resin composition of embodiment 19B wherein the amine-containing catalyst comprises a reaction product of phthalic anhydride and an aliphatic polyamine.

Embodiment 21B is the curable, one-part epoxy/thiol resin composition of embodiment 19B wherein the amine-containing catalyst comprises a reaction product of: (i) a polyfunctional epoxy compound; (ii) an imidazole compound, such as 2-ethyl-4-methylimidazole; and (iii) phthalic anhydride.

Embodiment 22B is the curable, one-part epoxy/thiol resin composition of embodiment 19B wherein the amine-containing catalyst comprises a reaction product of a compound having one or more isocyanate groups in its molecule with a compound having at least one primary or secondary amino group in its molecule.

Embodiment 23B is the curable, one-part epoxy/thiol resin composition of embodiment 19B wherein the amine-containing catalyst comprises 2-heptadeoylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2,4-diamino-8-2-methylimidazolyl-(1)-ethyl-5-triazine, or a combination thereof.

Embodiment 24B is the curable, one-part epoxy/thiol resin composition of embodiment 19B wherein the amine-containing catalyst comprises products of triazine with isocyanuric acid, succinohydrazide, adipohydrazide, isophtholohydrazide, o-oxybenzohydrazide, salicylohydrazide, or a combination thereof.

Embodiment 25B is the curable, one-part epoxy/thiol resin composition of any one of the preceding embodiments wherein the catalyst-containing particles are present in the curable composition in an amount of at least 0.1 wt-%, based on the total weight of the curable composition.

Embodiment 26B is the curable, one-part epoxy/thiol resin composition of any one of the preceding embodiments wherein the catalyst-containing particles are present in the curable composition in an amount of up to 35 wt-%, based on the total weight of the curable composition.

Embodiment 27B is the curable, one-part epoxy/thiol resin composition of any one of the preceding embodiments wherein the nitrogen-containing catalyst is present in a catalyst-containing particle in an amount of at least 50 wt-%, at least 55 wt-%, or at least 60 wt-%, based on total weight of the particle.

Embodiment 28B is the curable, one-part epoxy/thiol resin composition of any one of the preceding embodiments wherein the nitrogen-containing catalyst is present in a catalyst-containing particle in an amount of up to 80 wt-%, up to 75 wt-%, or up to 70 wt-%, based on the total weight of the particle.

Embodiment 29B is the curable, one-part epoxy/thiol resin composition of any one of the preceding embodiments wherein the coating layer is present in a catalyst-containing particle in an amount of at least 20 wt-%, at least 25 wt-%, or at least 30 wt-%, based on the total weight of the particle.

Embodiment 30B is the curable, one-part epoxy/thiol resin composition of any one of the preceding embodiments wherein the coating layer is present in a catalyst-containing particle in an amount of up to 50 wt-%, up to 45 wt-%, up to 40 wt-%, based on the total weight of the particle.

Embodiment 31B is the curable, one-part epoxy/thiol resin composition of any one of the preceding embodiments wherein the acidic coating layer comprises an acidic material selected from small molecule organic acids, acid-functional oligomers (e.g., acid-terminated oligomers), and acid-functional polymers (e.g., acid-terminated polymers) that are soluble or dispersible in water.

Embodiment 32B is the curable, one-part epoxy/thiol resin composition of any one of the preceding embodiments wherein the acidic coating layer comprises an acidic material selected from the group of a carboxylic acid, a quinone, a phenol, an enolizable material, a phosphoric acid, a sulfuric acid, and combinations thereof.

Embodiment 33B is the curable, one-part epoxy/thiol resin composition of embodiment 32B wherein the acidic material comprises a carboxylic acid of general Formula (II):

$R^4CO_2H$ wherein:
$R^4$ is trans-CH=CHCO$_2$H, —CH=CHCO$_2$(CH$_3$), —CH$_2$C(OR$^5$)(CO$_2$R$^6$)CH$_2$CO$_2$R$^7$ (wherein each R$^5$, R$^6$, and R$^7$ is independently H, (C1-C10)alkyl, or aryl), —(C11-C18)alkyl, —(CH$_2$)$_n$CO$_2$H (wherein n is 1-9), —(CHR$^8$)$_n$ CO$_2$H (wherein R$^8$ is H or —OH, and n is 1 or 2), —CH(OR$^9$)R$^{10}$ (wherein R$^9$ is H or (C1-C10)alkyl, and R$^{10}$ is (C1-C10)alkyl or phenyl), —CH=CH-aryl,

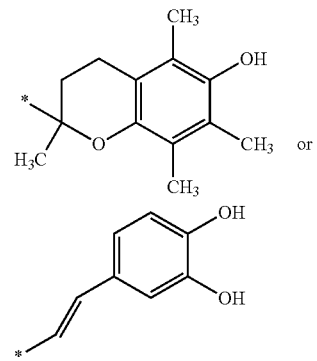

wherein the asterisks denote the sites of attachment of the R$^4$ groups.

Embodiment 34B is the curable, one-part epoxy/thiol resin composition of embodiment 32B wherein the acidic material comprises a benzoic acid of general Formula (III):

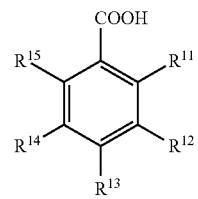

wherein:
R$^{11}$ is H, alkyl, haloakyl (such as —CX$_3$ wherein X is F, Cl, Br, I), alkenyl, aryl (e.g., phenyl), benzyl, —O-alkyl, —O-aryl (e.g., —O-phenyl), —O-benzyl, —S—S-arylene-CO$_2$H, —S—S-aryl (e.g., —S—S-phenyl), —SH, —S-alkyl, —S-haloalkyl, —S-aryl (e.g., —S-phenyl), —S-benzyl, —CO$_2$H,
—CO$_2$-alkyl, —CO$_2$-aryl (e.g., —CO$_2$-phenyl), —CO$_2$-benzyl, —C(O)H, —C(O)-alkyl, —C(O)-aryl (e.g., —C(O)-phenyl), —C(O)-benzyl, or —NO$_2$;

R$^{12}$ is H, alkyl, haloalkyl (such as —CX$_3$ wherein X is F, Cl, Br, I), alkenyl, aryl (e.g., phenyl), benzyl, —O-alkyl, —O-aryl (e.g., —O-phenyl), —O-benzyl, —CH$_2$-arylene-NO$_2$, —CO$_2$H,
—CO$_2$-alkyl, —CO$_2$-aryl (e.g., —CO$_2$-phenyl), —CO$_2$-benzyl, —C(O)H, —C(O)-alkyl, —C(O)-haloalkyl, —C(O)-aryl (e.g., —C(O)-phenyl), —C(O)-benzyl, or

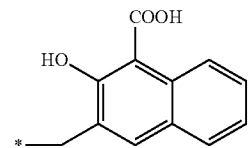 [SMILES: *Cc1cc2ccccc2c(C(=O)O)c1O]

wherein the asterisk denotes the site of attachment of the R$^{12}$ group;
R$^{13}$ is H, alkyl, haloalkyl (such as —CX$_3$ wherein X is F, Cl, Br, I), alkenyl, aryl (e.g., phenyl), benzyl, —OH, —O-alkyl, —O-aryl (e.g., —O-phenyl), —O-benzyl, —CO$_2$H, —CO$_2$-alkyl,
—CO$_2$-aryl (e.g., —CO$_2$-phenyl), —CO$_2$-benzyl, —C(O)H, —C(O)-alkyl, —C(O)-aryl (e.g., —C(O)-phenyl), —C(O)-benzyl, or —NO$_2$;

$R^{14}$ is H, alkyl, haloalkyl (such as —$CX_3$ wherein X is F, Cl, Br, I), alkenyl, aryl (e.g., phenyl), benzyl, —O-alkyl, —O-aryl (e.g., —O-phenyl), —O-benzyl, —$CO_2H$, —$CO_2$-alkyl, —$CO_2$-aryl (e.g., —$CO_2$-phenyl), —$CO_2$-benzyl, —C(O)H, —C(O)-alkyl, —C(O)-aryl (e.g., —C(O)-phenyl), or —C(O)-benzyl; and $R^{15}$ is H, alkyl, haloalkyl (such as —$CX_3$ wherein X is F, Cl, Br, I), alkenyl, aryl (e.g., phenyl), benzyl, —OH, —O-alkyl, —O-aryl (e.g., —O-phenyl), —O-benzyl, —$CO_2H$, —$CO_2$-alkyl, —$CO_2$-aryl (e.g., —$CO_2$-phenyl), —$CO_2$-benzyl, —C(O)H, —C(O)-alkyl, —C(O)-aryl (e.g., —C(O)-phenyl), —C(O)-benzyl, or —$NO_2$.

Embodiment 35B is the curable, one-part epoxy/thiol resin composition of embodiment 32B wherein the acidic material comprises a quinone of general Formula (IV):

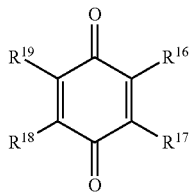

wherein:

$R^{16}$, $R^{17}$, $R^{18}$, and $R^{19}$ are independently H, alkyl, haloalkyl, alkenyl, aryl (e.g., phenyl), —OH, —O-alkyl, —O-aryl (e.g., —O-phenyl), —O-benzyl, or —CN.

Embodiment 36B is the curable, one-part epoxy/thiol resin composition of embodiment 32B wherein the acidic material comprises a phenol of general Formula (V):

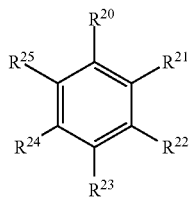

wherein:

$R^{20}$ is H or OH;

$R^{21}$ is H, alkyl, haloalkyl (such as —$CX_3$ wherein X is F, Br, Cl, I), alkenyl, —Cl, —F, —Br, —I, —CN, —OH, —O-alkyl, —O-aryl (e.g., —O-phenyl), —O-benzyl, —$NO_2$, —C(O)-alkyl, —C(O)-aryl (e.g., —C(O)-phenyl), —C(O)-benzyl, —C(O)H, —$CO_2H$, —$CO_2$-alkyl, —$CO_2$-aryl (e.g., —$CO_2$-phenyl), —$CO_2$-benzyl, or phenol;

$R^{22}$ is H, alkyl, haloalkyl (such as —$CX_3$ wherein X is F, Br, Cl, I), alkenyl, —OH, —O-alkyl, —O-aryl (e.g., —O-phenyl), —O-benzyl, aryl (e.g., phenyl), benzyl, —$CH_2$-aryl (e.g., —$CH_2$-phenyl), —CN, —F, —Cl, —Br, or —I;

$R^{23}$ is H, alkyl, haloalkyl (such as —$CX_3$ wherein X is F, Br, Cl, I), alkenyl, —$NO_2$, —C(O)-alkyl, —C(O)-aryl (e.g., —C(O)-phenyl), —C(O)-benzyl, —C(O)H, —$CO_2$-alkyl, —$CO_2$-aryl (e.g., —$CO_2$-phenyl), —$CO_2$-benzyl, —OH, —O-alkyl, —O-aryl (e.g., —O-phenyl), —O-benzyl, aryl (e.g., phenyl), benzyl, —$CH_2$-phenylene-OH, —$C(Me)_2$-phenylene-OH, —$CH_2$-aryl (e.g., —$CH_2$-phenyl), or

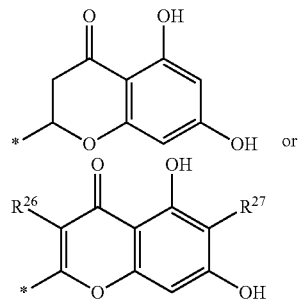

wherein:

$R^{26}$ and $R^{27}$ are independently H, alkyl, haloalkyl (such as —$CX_3$ wherein X is F, Br, Cl, I), alkenyl, —OH, —O-alkyl, —O-aryl (e.g., —O-phenyl), or —O—benzyl; and the asterisk denotes the site of attachment of the $R^{12}$ group;

$R^{24}$ is H, alkyl, haloalkyl (such as —$CX_3$ wherein X is F, Br, Cl, I), alkenyl, —OH, —O-alkyl, —O-aryl (e.g., —O-phenyl), —O-benzyl, —F, —Cl, —Br, —I, —CN, phenyl, benzyl, or —$CH_2$-aryl (e.g., —$CH_2$-phenyl); and $R^{25}$ is H, alkyl, haloalkyl (such as —$CX_3$ wherein X is F, Br, Cl, I), alkenyl, —F, —Cl, —Br, —I, —CN, —OH, —O-alkyl, —O-aryl (e.g., —O-phenyl), —O-benzyl, —$NO_2$, —C(O)-alkyl, —C(O)-aryl (e.g., —C(O)-phenyl), —O-benzyl, —C(O)H, —$CO_2H$, —$CO_2$-alkyl, —$CO_2$-phenyl, —$CO_2$-benzyl, or -phenol;

provided that a compound of general Formula V is chosen to have at least one phenolic group present.

Embodiment 37B is the curable, one-part epoxy/thiol resin composition of embodiment 32B wherein the acidic material comprises an enolizable material of general Formula (VI):

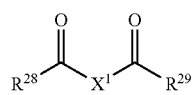

wherein:

$R^{28}$ or $R^{29}$ are independently $NR^{30}C(O)NR^{31}R^{32}$ (wherein $R^{30}$ is H, alkyl, aryl (e.g., phenyl); $R^{31}$ is H, alkyl, aryl (e.g., phenyl); $R^{32}$ is H, alkyl, aryl (e.g., phenyl), —OH, —O-alkyl, —O-aryl (e.g., —O-phenyl); and $X^1$ is —$(CH_2)_n$— (wherein n is 0-10), —$C(R^{33})_2$— (wherein $R^{33}$ is alkyl, aryl (e.g., phenyl), or —CN), —O—, —S—, or —$NR^{34}$— (wherein $R^{34}$ is H, alkyl, or aryl (e.g., phenyl)).

Embodiment 38B is the curable, one-part epoxy/thiol resin composition of embodiment 32B wherein the acidic material comprises an enolizable material of general Formula (VII):

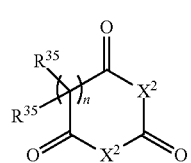

wherein: each $R^{35}$ is independently hydrogen or alkyl but wherein at least one $R^{35}$ is hydrogen; each $X^2$ is independently N—$R^{36}$ where $R^{36}$ is H or alkyl; and n is equal to 0 (the cyclic structure is a five membered ring) or equal to 1 (the cyclic structure is a six membered ring). In one example of Formula (VII), each $X^2$=NH, each $R^{35}$=H, and n=1. In another example, each $X^2$=N(CH$_3$), each $R^{35}$=H, and n=1. In yet another example, each $X^2$=NH and n=0.

Embodiment 39B is the curable, one-part epoxy/thiol resin composition of embodiment 32B wherein the acidic material comprises an enolizable material of general Formula (VIII):

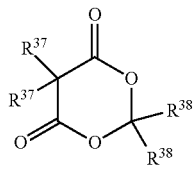

wherein: each $R^{37}$ is independently hydrogen, alkyl, or aryl but wherein at least one $R^{37}$ is hydrogen; and each $R^{38}$ is independently alkyl.

In one example of Formula (VIII), each $R^{37}$=H and each $R^{38}$=CH$_3$. In another example, one $R^{37}$=H, the other $R^{37}$=phenyl, and each $R^{38}$=CH$_3$.

Embodiment 40B is the curable, one-part epoxy/thiol resin composition of any one of the preceding embodiments wherein the coating layer comprises at least 1 wt-% acidic material in the form of one or more small molecule organic acids, based on the total weight of the coating layer.

Embodiment 41B is the curable, one-part epoxy/thiol resin composition of any one of the preceding embodiments wherein the coating layer includes up to 20 wt-% acidic material in the form of one or more small molecule organic acids, based on the total weight of the coating layer.

Embodiment 42B is the curable, one-part epoxy/thiol resin composition of any one of the preceding embodiments wherein the binder is soluble or dispersible in water.

Embodiment 43B is the curable, one-part epoxy/thiol resin composition of any one of the preceding embodiments wherein the binder is selected from: a (C1-C3)alkyl cellulose (e.g., methyl/propyl/ethyl celluloses); a hydroxyl (C1-C3)alkylcellulose (e.g., hydroxymethyl cellulose (i.e., hypromellose or HPMC), hydroxypropylmethyl cellulose, hydroxypropyl cellulose, and hydroxyethylcellulose); carboxy methylcellulose; sodium carboxymethylcellulose; polyoxazoline; a starch (e.g., pregelatinized starch and derivatized starch such as hydroxylated starch and carboxylated starch); a natural gum (e.g., acacia gum, sodium alginate, guar gum, xanthan gum); a thermoplastic polymer; a wax; or a combination thereof.

Embodiment 44B is the curable, one-part epoxy/thiol resin composition of embodiment 43B wherein the binder is a starch (e.g., pregelatinized starch and derivatized starch such as hydroxylated starch and carboxylated starch).

Embodiment 45B is the curable, one-part epoxy/thiol resin composition of embodiment 44B wherein the binder is a carboxylated starch that is acidic and functions as both the binder and an acidic material.

Embodiment 46B is the curable, one-part epoxy/thiol resin composition of embodiment 43B wherein the binder is a wax.

Embodiment 47B is the curable, one-part epoxy/thiol resin composition of embodiment 46B wherein the wax is a naturally occurring or synthetic material.

Embodiment 48B is the curable, one-part epoxy/thiol resin composition of embodiment 47B wherein the wax is an animal wax (e.g., beeswax and lanolin), a vegetable wax (e.g., Carnauba wax), a petroleum wax (e.g., paraffin, and hydrogenated oils such as hydrogenated vegetable oils), or a combination thereof.

Embodiment 49B is the curable, one-part epoxy/thiol resin composition of embodiment 47B wherein the wax includes a hydrophilic group.

Embodiment 50B is the curable, one-part epoxy/thiol resin composition of embodiment 43B wherein the binder is a thermoplastic polymer.

Embodiment 51B is the curable, one-part epoxy/thiol resin composition of embodiment 50B wherein the thermoplastic polymer comprises poly(vinylpyrrolidone) (i.e., povidone of PVP); polyvinyl alcohol; a polyester, a polyamide, a copolymer of vinylpyrrolidone and vinyl acetate, a (meth)acrylate-based thermoplastic polymer (e.g., (meth)acrylate-based polymers with acidic groups, such as copolymers of an alkyl (meth)acrylate and (meth)acrylic acid), a silicone-based thermoplastic polymer, an olefin-based thermoplastic polymer, a phenoxy resin (polyhydroxy ethers), a styrene-based thermoplastic polymer (e.g., polystyrene-acrylate-based latex polymers), or a combination thereof.

Embodiment 52B is the curable, one-part epoxy/thiol resin composition of embodiment 43B wherein the binder is a cellulose selected from a (C1-C3)alkyl cellulose (e.g., methyl/propyl/ethyl celluloses), a hydroxyl (C1-C3)alkylcellulose (e.g., hydroxymethyl cellulose (i.e., hypromellose or HPMC), hydroxypropylmethyl cellulose, hydroxypropyl cellulose, and hydroxyethylcellulose), carboxy methylcellulose, sodium carboxymethylcellulose, or a combination thereof.

Embodiment 53B is the curable, one-part epoxy/thiol resin composition of any one of the preceding embodiments wherein the coating layer comprises at least 80 wt-% neutral binder, based on the total weight of the coating layer.

Embodiment 54B is the curable, one-part epoxy/thiol resin composition of any one of the preceding embodiments wherein the coating layer comprises up to 99 wt-% neutral binder, based on the total weight of the coating layer.

Embodiment 55B is the curable, one-part epoxy/thiol resin composition of any of embodiments 1B through 54B wherein the coating layer comprises 100 wt-% of one or more acidic binders.

Embodiment 56B is the curable, one-part epoxy/thiol resin composition of any one of the preceding embodiments further comprising a nonionic surfactant in the coating layer.

Method of Making Particles

Embodiment 1C is a method of making particles of any one of embodiments 1A through 39A, the method comprising: providing nitrogen-containing catalyst particles; providing an aqueous coating composition comprising an acid and a binder, or an acidic binder; combining the nitrogen-containing catalyst particles with the aqueous coating composition to form a slurry; and subjecting the slurry to conditions effective to form dried catalyst-containing particles of any one of embodiments 1A through 39A; wherein each particle comprises a core and an acidic coating layer thereon, wherein the core comprises a nitrogen-containing catalyst (for a thermoset polymeric system), and the acidic coating layer comprises a binder.

Embodiment 2C is a method of making particles, the method comprising: providing nitrogen-containing catalyst particles; providing an aqueous coating composition comprising an acid and a binder, or an acidic binder; combining the nitrogen-containing catalyst particles with the aqueous coating composition to form a slurry; transferring the slurry to a drying chamber comprising an atomizer and a drying gas; and atomizing the slurry to form dried catalyst-containing particles; wherein each particle comprises a core and an acidic coating layer thereon, wherein the core comprises a nitrogen-containing catalyst (for a thermoset polymeric system), and the acidic coating layer comprises a binder.

Embodiment 3C is the method of embodiment 2C wherein the atomizer comprises a rotary wheel (centrifugal) atomizer, a single-fluid/pressure nozzle (hydraulic) atomizer, a two-fluid nozzle (pneumatic) atomizer, or an ultrasonic atomizer.

Embodiment 4C is the method of any one of embodiments 1C through 3C further comprising collecting the dried catalyst-containing particles.

Embodiment 5C is the method of embodiment 4C wherein collecting comprises collecting by gravity, or by using a cyclone, filter and bag, electrostatic separation, or the like.

Embodiment 6C is the catalyst-containing particle of any one of embodiments 1C through 5C wherein the binder is a starch (e.g., pregelatinized starch and derivatized starch such as hydroxylated starch and carboxylated starch).

Embodiment 7C is the catalyst-containing particle of embodiment 6C wherein the binder is a carboxylated starch that is acidic and functions as both the binder and an acidic material.

Method of Curing a Curable Composition

Embodiment 1D is a method of curing a curable, one-part epoxy/thiol resin composition comprising: providing a curable, one-part epoxy/thiol resin composition of embodiments 1B through 55B; and heating the curable, one-part epoxy/thiol resin composition to a temperature of at least 50° C.

Embodiment 2D is a method of curing a curable, one-part epoxy/thiol resin composition comprising: providing a curable, one-part epoxy/thiol resin composition comprising: an epoxy resin component comprising an epoxy resin having at least two epoxide groups per molecule; a thiol component comprising a polythiol compound having at least two primary thiol groups; catalyst-containing particles dispersed in the epoxy/thiol resin mixture; wherein each particle comprises a core and an acidic coating layer thereon, wherein the core comprises a nitrogen-containing catalyst for the epoxy resin, and the acidic coating layer comprises a binder; and heating the curable, one-part epoxy/thiol resin composition to a temperature of at least 50° C.

Embodiment 3D is the method of embodiment 2D comprising heating the curable, one-part epoxy/thiol resin composition to a temperature of up to 80° C.

Embodiment 4D is the method of embodiment 3D comprising heating the curable, one-part epoxy/thiol resin composition to a temperature of 60-65° C.

Embodiment 5D is a cured epoxy/thiol resin composition prepared by a method of any of embodiments 1D through 4D.

EXAMPLES

Summary of Materials

The materials with their sources were as listed in Table 1. Unless otherwise indicated, all materials were purchased from commercial sources and used as received.

TABLE 1

Materials List

| Designation | Description |
| --- | --- |
| ANCAMINE 2442 | Curing agent available under the trade name ANCAMINE 2442 from Air Products and Chemical, Inc., Allentown, PA, USA. |
| GLUCOPON 325 | Surfactant available under the trade name GLUCOPON 325 from BASF, Ludwigshafen, Germany. |
| LYCOAT | Modified hydroxypropyl pregelatinized starch available under the trade name LYCOAT from Roquette America, Inc., Geneva, IL, USA. |
| EPON 828 | Epoxy resin comprising the diglycidylether of bisphenol A available under the trade name EPON RESIN 828 from Momentive Specialty Chemicals, Inc., Columbus, OH, USA. |
| TMPMP | Trimethylolproapne tri(3-mercaptopropionate) available from Sigma-Aldrich, St. Louis, MO, USA. |
| $CaCO_3$ | Calcium carbonate available under the trade name OMYACARB 5-FL from Omya, Inc., Cincinnati, OH, USA. |
| Fumed silica | Pyrogenic silica available under the trade name HDK H18 from Wacker Chemie AG, Munich, Germany. |
| 1,3-dimethyl barbituric acid | Substituted barbituric acid, available from Alfa Aesar, Ward Hill, MA, USA. |
| Barbituric acid | Available from Merck, Kenilworth, NJ, USA. |
| PAA | Poly(acrylic acid), $M_w$ = 450K, available from Sigma-Aldrich, St. Louis, MO, USA. |

Test Methods

Differential Scanning Calorimetry (DSC)

Differential scanning calorimetry (DSC) was performed on a Q2000 model differential scanning calorimeter (TA Instruments Inc., New Castle, Del., USA). DSC samples were typically 6 to 20 milligrams. Testing was done in sealed, aluminum, T-zero sample pans (TA Instruments, Inc., New Castle, Del., USA) and ramped through a heat cycle between room temperature (25° C.) and 300° C. at a rate of 10° C./min. The data from the reaction process was graphed on a chart showing heat flow versus temperature. The integrated area under an exothermic peak represents the total exotherm energy produced during the reaction and is measured in Joules/gram (J/g); the exotherm energy is proportional to extent of cure (that is, degree of polymerization). The exotherm profile (that is, the onset temperature (the temperature at which reaction will begin to occur), the peak temperature, and the end temperature) provides information on conditions needed to cure the sample. For the measurement of curing time at 90° C., a 60 minute isothermal program was started by jumping the temperature to 90° C. The data from the reaction process was graphed on a chart showing heat flow versus time. The curing time was represented as the end of peak when the heat flow was overlapped with baseline.

Shelf-Life Test

Curable samples were placed at room temperature under ambient conditions. The viscosity of the compositions were monitored until the mixture could not be stirred by hand.

Rheology

Viscosity of the fully formulated samples was run by shear rate sweeping using an ARES-G2 rheometer (TA Instruments, Inc., New Castle, Del.) at 25° C. using a 25 mm diameter stainless steel cone with a cone angle of 0.09896 rad and a 50 mm plate. The initial shear rate was 20 s$^{-1}$ and the final rate was 0.2 s$^{-1}$. Twenty points of data were recorded. For the purpose of monitoring change in viscosity over time, the measured viscosity with a shear rate of 4.1 l/s was used.

Overlap Shear Strength (OLS)

Overlap shear strength of each adhesive film formulation was measured by bonding 25 mm×100 mm×1.6 mm steel coupons into test specimens as described in ASTM 1002-01. The steel coupons used for measuring shear strength were cold-rolled steel (obtained from Q-Lab Corp., Westlake, Ohio, USA under the trade designation "Q-PANEL, RS-14"). The steel coupons were prepared by wiping them with acetone and allowing them to air-dry for five minutes. The adhesives were applied and the two steel coupons were mated together. The total thickness of the adhesive film was approximately 250 micrometers by using 10 mil (about 254 micrometers or 0.010 inches) glass beads as spacers, then clamped in place using disposable binder clips. The samples were cured in the oven at 90° C. for 30 minutes. Upon curing, the clips were removed. Overlap shear specimens were clamped into the jaws of a tensile tester (INSTRON, MODEL 5581, High Wycombe, United Kingdom, equipped with a 10,000 pound (about 4536 kilogram) load cell) and pulled apart to bond failure at a crosshead speed of 12.5 millimeters (mm) per minute. Results were reported in megapascals (MPa).

Preparative Example 1 (PE-1)

In a 1 liter (L) glass beaker 160 g of ANCAMINE 2442 particles were added to a solution containing 4 g of 1,3-dimethyl barbituric acid and 36 g of LYCOAT in 600 g of water to give a 25 wt-% solid suspension. The suspension was mixed with a high shear mixer (IKA T50 digital ultra turrax, Staufen im Breisgau, Germany) at 2000 rpm for 5 minutes. The resulting slurry was dried using a customized MODEL 48 mixed flow spray dryer fabricated by Spray Drying Systems, Inc. (headquartered in Eldersburg, Md., USA). The spray dryer measured 4 ft (1.2 m) in diameter with 8 ft (2.4 m) straight sides. The spray dryer was operated in closed loop mode (the system was purged with nitrogen, which was then recycled during operation as the bulk drying gas). During operation, this bulk drying gas was heated via an electric heater and carried through the drying chamber (entered through the top and exited through the bottom) and finally to a cyclone and a baghouse before passing through the blower (a 1 horse power dryer obtained from Airtech Inc. of Rutherford, N.J., USA) and the condenser (to condense out the solvent) before returning to the heater for reuse. The cyclone separated the product solids from the gas stream; the solids collected in the baghouse were discarded. The bulk drying gas temperature at the drying chamber inlet was approximately 106° C. while the outlet of the drying chamber was approximately 63-68° C. The slurry was provided at approximately 42 grams per minute via a pneumatic peristaltic pump, using a MASTERFLEX (Vernon Hills, Ill., USA) 96420-16 platinum-cured silicone tubing line (single split to double right before pump). The slurry was atomized vertically upward utilizing internally mixed two-fluid pressure spray atomizing nozzles (available from Spraying Systems Co. (Wheaton, Ill., USA) under the trade designations "FLUID CAP 60100" and "AIR CAP 170"). The atomizing gas was nitrogen, provided at 12 pounds per square inch (psi) (0.08 MPa) and 3.80 (±0.05) standard cubic feet per minute (approximately 108 standard liters per minute). After spray drying, 150.6 g of free-flow powders were obtained. The resulting catalyst-containing particles contained 80 wt-% of ANCAMINE 2442 catalyst and 2.5 wt-% of 1,3-dimethyl barbituric acid.

Figure 2:
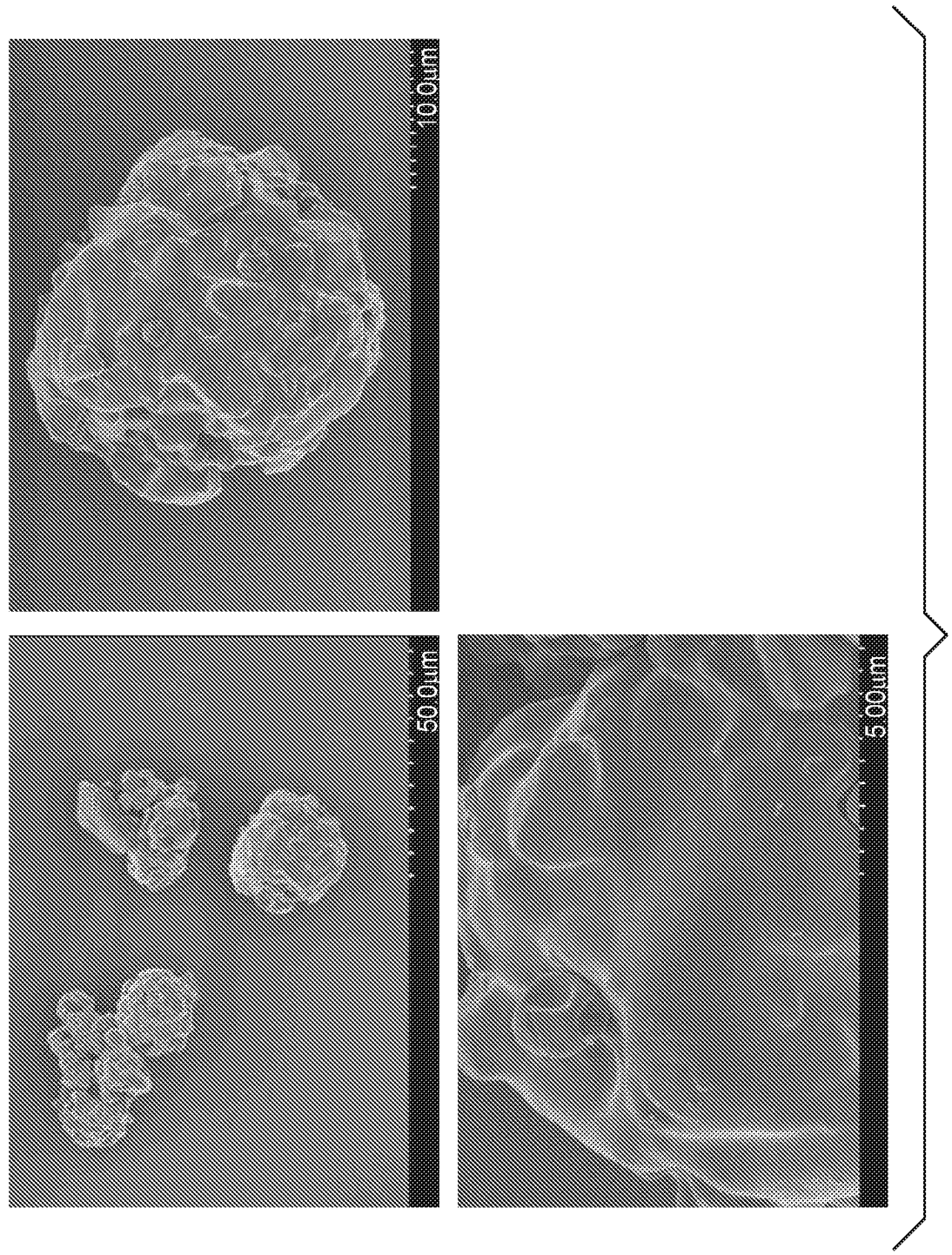
FIG. 2. SEM micrographs of ANCAMINE 2442/starch/ 1,3-dimethyl barbituric acid catalyst-containing particles (PE-1) obtained by spray drying.

FIG. 1 shows SEM micrographs of uncoated ANCAMINE 2442. FIG. 2 shows SEM micrographs of ANCAMINE 2442/starch/1,3-dimethyl barbituric acid catalyst-containing particles (PE-1) obtained by spray drying.

Preparative Example 2 (PE-2)

In a 1 L glass beaker, 160 g of ANCAMINE 2442 particles were added to a solution of 4 g of PAA and 36 g of LYCOAT in 600 g of water to give a 25 wt-% solid suspension. The suspension was mixed with high shear mixer (IKA T50 digital ultra turrax, Staufen im Breisgau, Germany) at 2000 revolutions per minute (rpm) for 5 minutes. This polymer mixture was then spray dried, as described in PE-1 (specifically the inlet drying gas temperature was 107° C. (±2), the outlet was 68° C. (±2), and the slurry flow varied from 18.7-30.8 grams per minute). After spray drying, 66.2 g of free-flow powders were obtained. The resulting catalyst-containing particles contained 80 wt-% of ANCAMINE 2442 catalyst and 2.5 wt-% of PAA.

Figure 3:
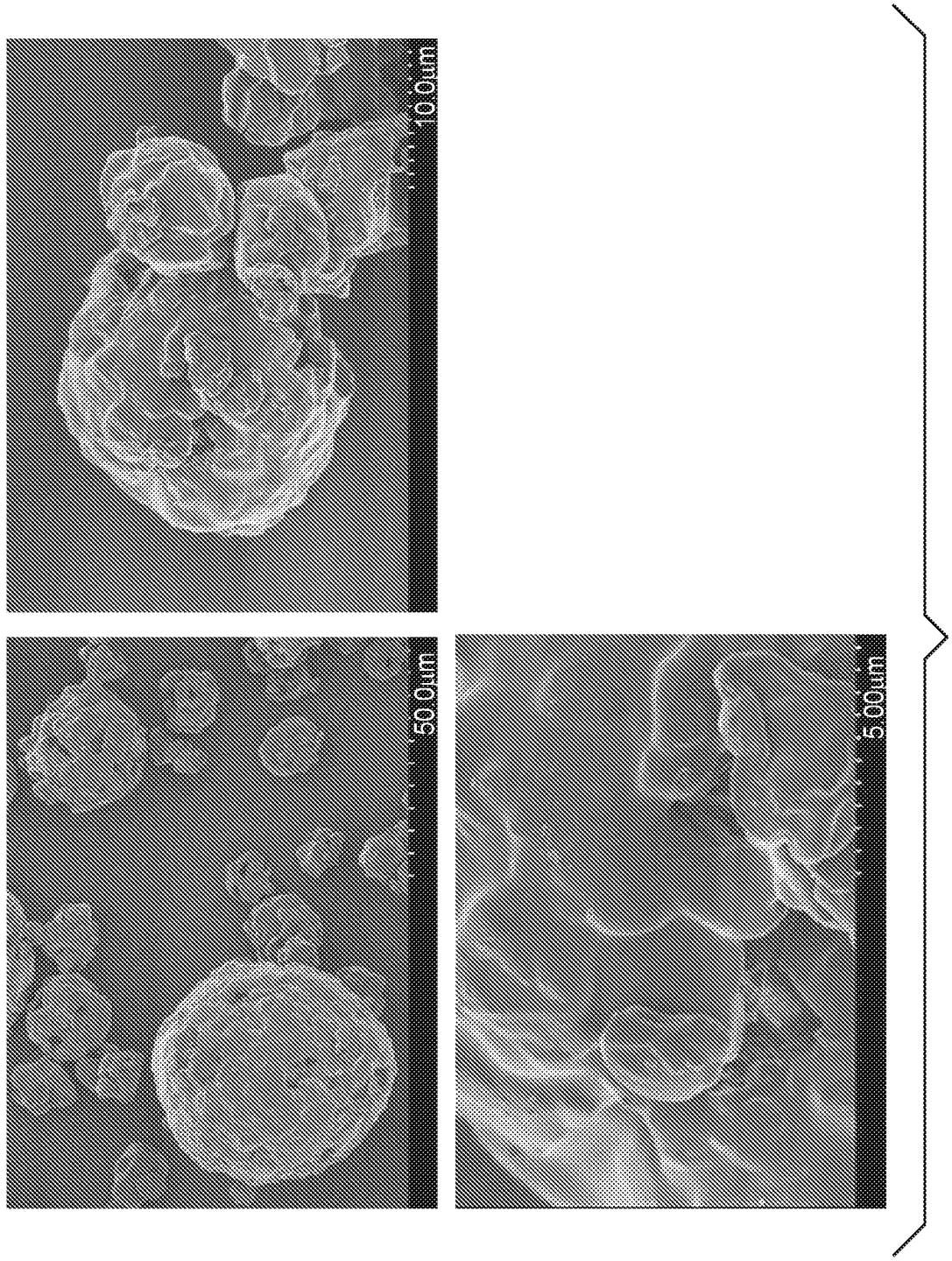
FIG. 3. SEM micrographs of ANCAMINE 2442/starch/ poly(acrylic acid) catalyst-containing particles (PE-2) obtained by spray drying.

FIG. 3 shows SEM micrographs of ANCAMINE 2442/starch/poly(acrylic acid) catalyst-containing particles (PE-2) obtained by spray drying.

Preparative Example 3 (PE-3)

In a 1 L glass beaker, 160 g of ANCAMINE 2442 particles were added to a solution of 4 g of barbituric acid and 36 g of LYCOAT in 600 g of water to give a 25 wt-% solid suspension. The suspension was mixed with high shear mixer (IKA T50 digital ultra turrax, Staufen im Breisgau, Germany) at 2000 rpm for 5 minutes. This polymer mixture was then spray dried, as described in PE-1 (specifically the inlet drying gas temperature was 108° C. (±2), the outlet was 62° C. (±2), the slurry flow was 46 (±2) grams per minute). After spray drying, 151.0 g of free-flow powders were obtained. The resulting catalyst-containing particles contained 80 wt-% of ANCAMINE 2442 catalyst and 2.5 wt-% of barbituric acid.

Figure 4:
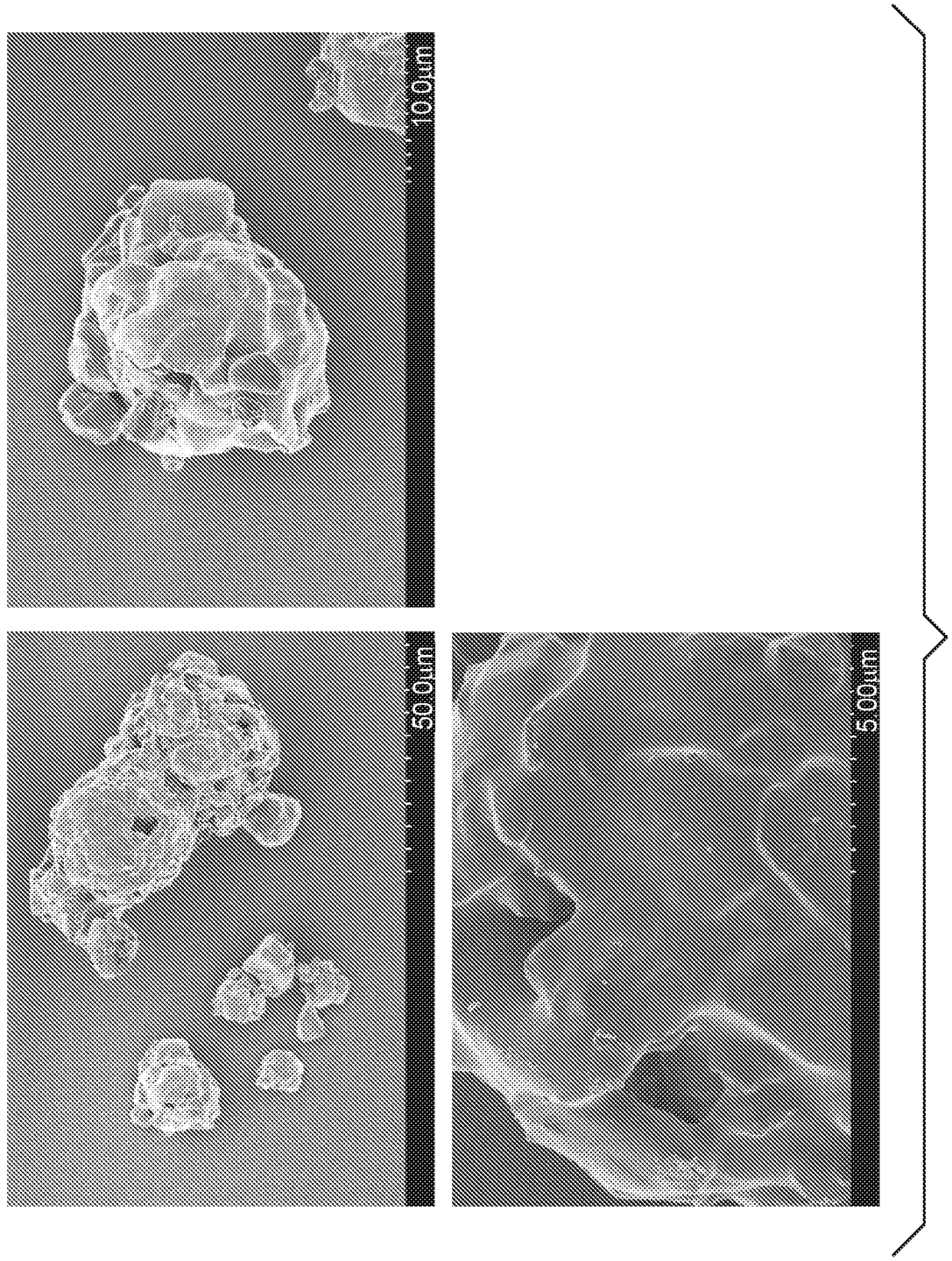
FIG. 4. SEM micrographs of ANCAMINE 2442/starch/ barbituric acid catalyst-containing particles (PE-3) obtained by spray drying.

FIG. 4 is SEM micrographs of ANCAMINE 2442/starch/barbituric acid catalyst-containing particles (PE-3) obtained by spray drying.

Preparative Example 4 (PE-4)

In a 1 L glass beaker, 140 g of ANCAMINE 2442 particles were added to a solution of 20 g of 1,3-dimethyl barbituric acid and 40 g of LYCOAT in 600 g of water to give a 25 wt-% solid suspension. The suspension was mixed with a high shear mixer (IKA T50 digital ultra turrax, Staufen im Breisgau, Germany) at 2000 rpm for 5 minutes. This polymer mixture was then spray dried, as described in PE-1. After spray drying, 158.6 g of free-flow powders were obtained. The resulting catalyst-containing particles contained 70 wt-% ANCAMINE 2442 catalyst.

Preparative Example 5 (PE-5)

In a 1 L glass beaker, 66.0 g of ANCAMINE 2442 particles were added to a solution of 33.5 g of poly(acrylic acid) in 300 g of water, followed by adding 0.5 g of GLUCOPON 325. The suspension was mixed with a high shear mixer (IKA T50 digital ultra turrax, Staufen im Breisgau, Germany) at 2000 rpm for 5 minutes. This polymer mixture was then spray dried, as described in PE-1. After spray drying, 76.0 g of free-flow powders were obtained. The resulting catalyst-containing particles contained 66 wt-% ANCAMINE 2442 catalyst.

Preparative Example 6 (PE-6)

For Preparative Example 6, no acid was incorporated into the catalyst-containing particles. In a 1 L glass beaker, 80 g of ANCAMINE 2442 particles were added to a solution of 20 g of LYCOAT in 300 g of water. The suspension was mixed with a high shear mixer (IKA T50 digital ultra turrax, Staufen im Breisgau, Germany) at 2000 rpm for 5 minutes. This polymer mixture was then spray dried, as described in PE-1. After spray drying, 85.0 g of free-flow powders were obtained. The resulting catalyst-containing particles contained 80 wt-% ANCAMINE 2442 catalyst.

Examples 1-5 (E-1-5) and Comparative Examples 1-4 (CE-1-4): One-Part Low Temperature Curable Systems Containing the Prepared Catalyst-Containing Particles For each Example 1-5, the respective amounts of TMPMP, EPON 828, CaCO₃, and fumed silica were combined in MAX 20 cups (Flacktek Inc., Landrum, S.C., USA) according to Table 2 and fully mixed using a DAC 150.1 FV Speedmixer (FlackTek Inc., Landrum, S.C., USA) for 1 minute at 2000 rpm. After cooling to room temperature for 1 minute, the appropriate prepared catalyst-containing particle type (e.g., PE-1, PE-2, PE-3, PE-4, or PE-5) was added to the mixture, as listed in Table 2, and was further mixed using a DAC 150.1 FV Speedmixer (FlackTek Inc., Landrum, S.C.) for 30 seconds at 1000 rpm. After formulation, all samples were stored at room temperature for testing and shelf life evaluation.

For each Comparative Example 1-4, the respective amounts of TMPMP, EPON 828, CaCO₃, and fumed silica were combined in MAX 20 cups (FlackTek, Inc., Landrum, S.C., USA) according to Table 3 and fully mixed using a DAC 150.1 FV Speedmixer (FlackTek Inc., Landrum, S.C., USA) for 1 minute at 2000 rpm. After cooling to room temperature for 1 minute, latent catalyst (e.g., ANCAMINE 224, 1,3-dimethyl barbituric acid, and pure barbituric acid) and/or PE-6 was added to the mixture, according to Table 3, and was further mixed using a DAC 150.1 FV Speedmixer (FlackTek Inc., Landrum, S.C., USA) for 30 seconds at 1000 rpm. After formulation, all samples were stored at room temperature for testing and shelf life evaluation.

TABLE 2

Formulation Information of Examples

| | E-1 | E-2 | E-3 | E-4 | E-5 |
|---|---|---|---|---|---|
| TMPMP | 2.4 | 2.4 | 2.4 | 2.4 | 2.4 |
| EPON 828 | 3.1 | 3.1 | 3.1 | 3.1 | 3.1 |
| CaCO₃ | 3.4 | 3.4 | 3.4 | 3.4 | 3.4 |
| Fumed silica | 0.18 | 0.18 | 0.18 | 0.18 | 0.18 |
| PE-1 Catalyst-containing particles with 1,3-dimethyl barbituric acid | 0.66 | | | | |
| PE-2 Catalyst-containing particles with PAA | | 0.66 | | | |
| PE-3 Catalyst-containing particles with barbituric acid | | | 0.66 | | |
| PE-4 Catalyst-containing particles with 1,3-dimethyl barbituric acid | | | | 0.76 | |
| PE-5 Catalyst-containing particles with PAA | | | | | 0.80 |

TABLE 3

Formulation Information of Comparative Examples

| | CE-1 | CE-2 | CE-3 | CE-4 |
|---|---|---|---|---|
| TMPMP | 2.4 | 2.4 | 2.4 | 2.4 |
| EPON 828 | 3.1 | 3.1 | 3.1 | 3.1 |
| CaCO₃ | 3.4 | 3.4 | 3.4 | 3.4 |
| Fumed silica | 0.18 | 0.18 | 0.18 | 0.18 |
| ANCAMINE 2442 | 0.53 | | | 0.53 |
| PE-6 Non-acid catalyst-containing particles | | 0.66 | 0.66 | |
| 1,3-dimethyl barbituric acid | | | 0.013 | |
| Pure barbituric acid | | | | 0.013 |

TABLE 4

Initial cure properties of examples

| | E-1 | E-2 | E-3 | E-4 | E-5 |
|---|---|---|---|---|---|
| Onset Temp (° C.) | 85.01 | 92.44 | 87.71 | 101.35 | 111.90 |
| Peak Temp (° C.) | 93.63 | 101.61 | 96.37 | 105.74 | 121.74 |
| Delta H (J/g) | 166.2 | 226.5 | 237.5 | 150.5 | 75.91 |
| Cure time at 90° C. (min) | 3.8 | 5.8 | 5.0 | 12.0 | 15.0 |
| Cure time at 70° C. (min) | 12.8 | 25.6 | 13.8 | 28.7 | 35.5 |
| Cure time at 60° C. (min) | 29.9 | 45.5 | 35.0 | 59.6 | 90.0 |
| Shelf life at RT (day) | 40 | 35 | 48 | 70 | >70 |
| Overlap shear strength (MPa) | 28.2 ± 1.1 | 29.0 ± 2.2 | 27.5 ± 1.0 | 29.5 ± 4.5 | 27.3 ± 1.5 |

TABLE 5

Initial cure properties of comparative examples

| | CE-1 | CE-2 | CE-3 | CE-4 |
|---|---|---|---|---|
| Onset Temp (° C.) | 72.23 | 90.2 | 101.42 | 73.2 |
| Peak Temp (° C.) | 81.64 | 100.3 | 108.7 | 82.6 |
| Delta H (J/g) | 308.7 | 187.4 | 212.0 | 358.4 |
| Cure time at 90° C. (min) | 2.0 | 5.5 | 11.5 | 2.7 |
| Cure time at 70° C. (min) | 5.3 | 19.9 | 44.6 | 5.7 |
| Cure time at 60° C. (min) | 12.9 | 41.5 | >60 | 15.8 |
| Shelf life at RT (day) | <1 | 20 | 21 | 7 |
| Overlap shear strength (MPa) | 25.7 ± 1.9 | 27.4 ± 0.9 | 28.5 ± 1.5 | 26.3 ± 1.8 |

TABLE 6

Change in viscosity over time

| Days | E-1 | E-2 | E-3 |
|---|---|---|---|
| 0 | 32.69 | 35.60 | 36.80 |
| 4 | 37.99 | 38.74 | 37.02 |
| 16 | 32.91 | 36.37 | 38.48 |
| 20 | 39.67 | 40.15 | 39.10 |
| 27 | 42.52 | 43.26 | 33.89 |
| 31 | 102.69 | 212.35 | 78.98 |
| 35 | 180.82 | cured | 97.92 |
| 40 | cured | | 225.35 |
| 45 | | | 338.82 |
| 48 | | | cured |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed:

1. A curable, one-part epoxy/thiol resin composition comprising:
    an epoxy/thiol resin mixture comprising:
        an epoxy resin component comprising an epoxy resin having at least two epoxide groups per molecule;
        a thiol component comprising a polythiol compound having at least two primary thiol groups; and
    catalyst-containing particles dispersed in the epoxy/thiol resin mixture;
    wherein each particle comprises a core and an acidic coating layer thereon, wherein the core comprises a nitrogen-containing catalyst for the epoxy resin, and the acidic coating layer comprises 5 to 50 weight percent of a binder selected from a (C1-C3)alkyl cellulose, a hydroxyl (C1-C3)alkyl cellulose, carboxy methylcellulose, sodium carboxymethylcellulose, a starch, or a combination thereof.

2. The curable, one-part epoxy/thiol resin composition of claim 1 which is curable at a temperature of at least 50° C.

3. The curable, one-part epoxy/thiol resin composition of claim 1 wherein the acidic coating layer further comprises a nonionic surfactant in the coating layer.

4. The curable, one-part epoxy/thiol resin composition of claim 1 wherein the epoxy resin comprises a polyglycidyl ether of a polyhydric phenol, a reaction product of a polyhydric alcohol with epichlorohydrin, an epoxidised (poly) olefinic resin, an epoxidised phenolic novolac resin, an epoxidised cresol novolac resin, a cycloaliphatic epoxy resin, a glycidyl ether ester, a polyglycidyl ester, a urethane modified epoxy resin, or a combination of two or more thereof.

5. The curable, one-part epoxy/thiol resin composition of claim 1 wherein the epoxy resin component is present in an amount of at least 20 wt-%, and up to 80 wt-%, based on the total weight of the curable epoxy/thiol resin composition.

6. The curable, one-part epoxy/thiol resin composition of claim 1 wherein the polythiol compound comprises trimethylolpropane tris(beta-mercaptopropionate), trimethylolpropane tris(thioglycolate), pentaerythritol tetrakis(thioglycolate), pentaerythritol tetrakis(beta-mercaptopropionate), dipentaerythritol poly(beta-mercaptopropionate), ethylene glycol bis(beta-mercaptopropionate), a (C1-C12)alkyl polythiol, a (C6-C12)aromatic polythiol, or a combination of two or more thereof.

7. The curable, one-part epoxy/thiol resin composition of claim 1 wherein the thiol component is present in an amount of at least 25 wt-%, and up to 70 wt-%, based on a total weight of the curable epoxy/thiol resin composition.

8. The curable, one-part epoxy/thiol resin composition of claim 1 wherein the epoxy component and the thiol component are present in a ratio of from 0.5:1 to 1.5:1 (epoxy: thiol equivalents).

9. The curable, one-part epoxy/thiol resin composition of claim 1 wherein the nitrogen-containing catalyst is capable of activation at temperatures at or above 50° C. to affect the thermal curing of the epoxy resin.

10. The curable, one-part epoxy/thiol resin composition of claim 1 wherein the nitrogen-containing catalyst is an amine-containing catalyst.

11. The curable, one-part epoxy/thiol resin composition of claim 1 wherein the catalyst-containing particles are present in the curable composition in an amount of at least 0.1 wt-%, and up to 35 wt-%, based on the total weight of the curable epoxy/thiol resin composition.

12. The curable, one-part epoxy/thiol resin composition of claim 1 wherein the nitrogen-containing catalyst is present in a catalyst-containing particle in an amount of at least 20 wt-%, and up to 80 wt-%, based on the total weight of the particle.

13. The curable, one-part epoxy/thiol resin composition of claim 1 wherein the coating layer is present in a catalyst-containing particle in an amount of at least 20 wt-%, and up to 80 wt-%, based on the total weight of the particle.

14. The curable, one-part epoxy/thiol resin composition of claim 1 wherein the acidic coating layer comprises an acidic material selected from small molecule organic acids, acid-functional oligomers, and acid-functional polymers that are soluble or dispersible in water.

15. The curable, one-part epoxy/thiol resin composition of claim 1 wherein the acidic coating layer comprises an acidic material selected from the group of a carboxylic acid, a quinone, a phenol, an enolizable material, a phosphoric acid, a sulfuric acid, and combinations thereof.

16. The curable, one-part epoxy/thiol resin composition of claim 1 wherein the curable, one-part epoxy/thiol resin composition has a shelf life at room temperature of at least 4 weeks.

17. A method of making catalyst-containing particles, the method comprising:
    providing nitrogen-containing catalyst particles;
    providing an aqueous coating composition comprising an acid and a binder;
    combining the nitrogen-containing catalyst particles with the aqueous coating composition to form a slurry; and
    subjecting the slurry to conditions effective to form dried catalyst-containing particles;
    wherein each particle comprises a core and an acidic coating layer thereon, wherein the core comprises a nitrogen-containing catalyst, and the acidic coating layer comprises 5 to 50 weight percent of a binder selected from a (C1-C3)alkyl cellulose, a hydroxyl (C1-C3)alkyl cellulose, carboxy methylcellulose, sodium carboxymethylcellulose, a starch, or a combination thereof.

18. A method of curing a curable, one-part epoxy/thiol resin composition comprising:
    providing a curable, one-part epoxy/thiol resin composition comprising:
        an epoxy resin component comprising an epoxy resin having at least two epoxide groups per molecule;
        a thiol component comprising a polythiol compound having at least two primary thiol groups;
        catalyst-containing particles dispersed in the epoxy/ thiol resin mixture;
        wherein each particle comprises a core and an acidic coating layer thereon, wherein the core comprises a nitrogen-containing catalyst for the epoxy resin, and the acidic coating layer comprises 5 to 50 weight percent of a binder selected from a (C1-C3)alkyl cellulose, a hydroxyl (C1-C3)alkyl cellulose, carboxy methylcellulose, sodium carboxymethylcellulose, a starch, or a combination thereof; and heating the curable, one-part epoxy/thiol resin composition to a temperature of at least 50° C.

* * * * *